(12) United States Patent
Miyazaki et al.

(10) Patent No.: US 8,738,260 B2
(45) Date of Patent: May 27, 2014

(54) BRAKE CONTROL SYSTEM, AND BRAKE CONTROL METHOD

(75) Inventors: Tetsuya Miyazaki, Toyota (JP); Kazunori Nimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 108 days.

(21) Appl. No.: 13/389,405

(22) PCT Filed: Aug. 7, 2009

(86) PCT No.: PCT/JP2009/003820
§ 371 (c)(1),
(2), (4) Date: Feb. 7, 2012

(87) PCT Pub. No.: WO2011/016095
PCT Pub. Date: Feb. 10, 2011

(65) Prior Publication Data
US 2012/0136547 A1      May 31, 2012

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC ................ 701/70; 701/78; 701/79; 701/83; 180/65.265; 180/65.275; 303/152; 903/947

(58) Field of Classification Search
USPC .............. 701/1, 22, 36, 70, 78, 79, 83, 84; 180/65.21, 65.265, 65.275; 303/152; 903/902, 904, 947
See application file for complete search history.

(56) References Cited

U.S. PATENT DOCUMENTS

| 5,318,355 | A | 6/1994 | Asanuma et al. |
| 7,136,737 | B2 * | 11/2006 | Ashizawa et al. ............... 701/70 |
| 7,530,649 | B2 * | 5/2009 | Kusano ......................... 303/151 |
| 2007/0241611 | A1 * | 10/2007 | Shimada et al. .............. 303/152 |
| 2009/0026987 | A1 * | 1/2009 | Takahashi ..................... 318/376 |
| 2013/0211644 | A1 * | 8/2013 | Yokoyama et al. ............. 701/22 |

FOREIGN PATENT DOCUMENTS

| JP | 6-1220 | 1/1994 |
| JP | 06 153316 | 5/1994 |
| JP | 2004 155403 | 6/2004 |
| JP | 2006 044654 | 2/2006 |
| JP | 2006 143099 | 6/2006 |
| JP | 2007 288904 | 11/2007 |
| WO | 2009/081270 | 7/2009 |

OTHER PUBLICATIONS

International Search Report Issued Nov. 17, 2009 in PCT/JP09/003820 Filed Aug. 7, 2009.

* cited by examiner

*Primary Examiner* — Rami Khatib
(74) *Attorney, Agent, or Firm* — Oblon, Spivak, McClelland, Maier & Neustadt, L.L.P.

(57) ABSTRACT

A brake control system includes: a friction brake unit for generating a friction braking force; a regenerative brake unit for generating a regenerative braking force; and a control unit for controlling the regenerative and friction brake units based on a regenerative target value and a friction target value defined based on a target deceleration, and for controlling a braking force by selecting one of a plurality of control modes including both a regeneration permission mode in which a total braking force is generated by the regenerative and friction braking forces, and a regeneration prohibition mode in which the target deceleration is generated by the friction braking force. In the permission mode, the control unit generates the total force by providing a delay, while in the prohibition mode, the control unit provides a delay smaller than the above delay to the friction braking force or does not provide a delay.

10 Claims, 13 Drawing Sheets

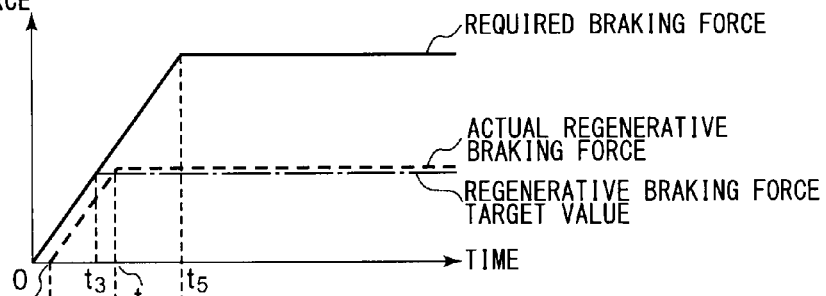
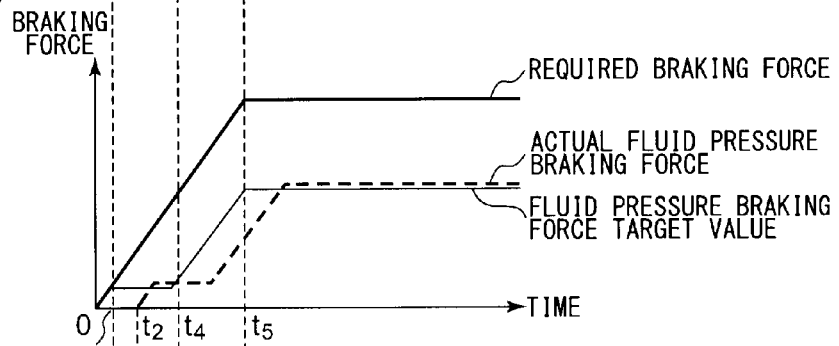
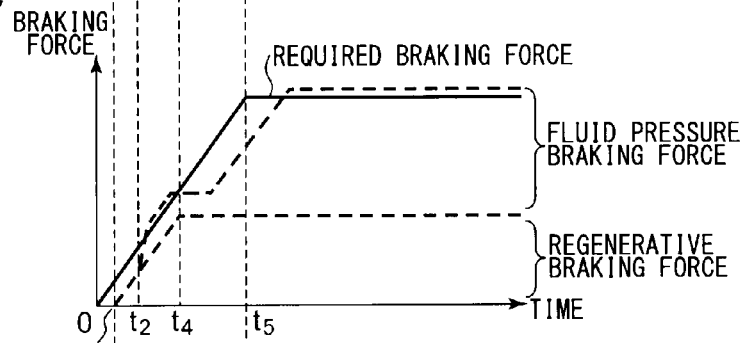
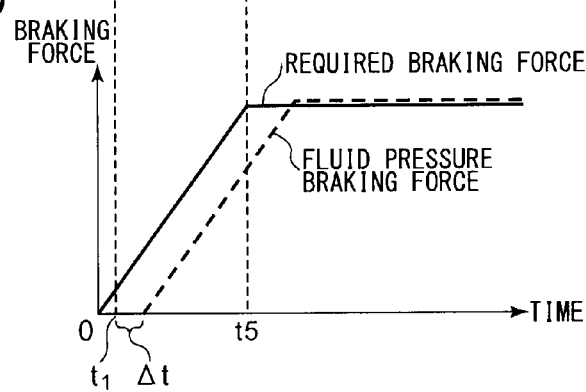

BRAKE CONTROL SYSTEM, AND BRAKE CONTROL METHOD

TECHNICAL FIELD

The present invention relates to a brake control system and a brake control method for controlling a braking force to be provided to a wheel provided in a vehicle.

BACKGROUND ART

A cooperative control system of a brake with a combination system in which a regenerative brake system and a fluid pressure brake system are both provided is described in, for example, Patent Document 1. In this system, when a vehicle is being brought to a halt, regenerative braking torque is gradually reduced and fluid pressure braking torque is gradually increased, under a total braking torque command value required by a driver. In this case, it is said that, by compensating, with the regenerative braking torque, the difference between a command value and an actual value of the braking force directed to the fluid pressure brake system whose response is late, the total braking torque actual value can be made equal to the total braking torque command value. The regenerative braking torque command value is to be defined so as to be within a maximum braking torque limit value that is calculated by subtracting a predetermined amount from the regenerable maximum braking torque, in order to allow a margin for correcting the regenerative braking torque command value.

Patent Document

[Patent Document 1] Japanese Patent Application Publication No. 2004-155403

DISCLOSURE OF THE INVENTION

Problem to be Solved by the Invention

Because regenerative braking is used for improving the fuel consumption of a vehicle, it is desirable to utilize the regenerative braking at a maximum. Accordingly, it is not preferable to impose a limit on the regenerative braking torque command value, as in the aforementioned brake system. On the other hand, with the spread of the vehicles in each of which a regenerative brake system is mounted, a required performance of the regeneration cooperative control will be higher. It is desirable not only to have a good fuel consumption performance, but also to achieve more comfortable braking.

In view of these situations, a purpose of the present invention is to provide a brake control system and a brake control method in which an excellent fuel consumption performance and a good brake feeling can be both achieved.

Means for Solving the Problem

A brake control system according to an embodiment of the present invention comprises: a friction brake unit configured to generate a friction braking force; a regenerative brake unit configured to generate a regenerative braking force; and a control unit configured to control a braking force by selecting one of a plurality of control modes including both a regeneration permission mode in which a total braking force is generated by the regenerative braking force and the friction braking force with the regenerative brake unit and the friction brake unit being controlled based on a regenerative target value and a friction target value that are defined based on a target deceleration, and a regeneration prohibition mode in which the target deceleration is generated by the friction braking force. In the regeneration permission mode, the control unit generates the total braking force by providing a delay, while in the regeneration prohibition mode, the control unit provides a delay smaller than the above delay to the friction braking force or does not provide a delay.

The regenerative brake unit usually has a higher response property than the friction brake unit. Accordingly, a difference in brake feeling, which can be caused by the response property of a braking force, can be reduced by outputting a braking force at a delayed time in the regeneration permission mode, in comparison with the regeneration prohibition mode. For example, a difference in the rise timing of a braking force can be reduced. Also, by providing a delay to the total braking force in the regeneration permission mode, that is, by delaying a braking force as a whole, a braking force distribution before the provision of the delay is maintained after the provision thereof. Accordingly, the ratio of the regenerative braking force to the total braking force can be maintained without being lowered. Therefore, the improvement in fuel consumption by a regenerative braking force and the suppression of a variation in brake feeling by a brake control mode can be both satisfied.

The regeneration permission mode may be a regeneration preference mode in which a regenerative braking force is preferentially generated and a shortage of the regenerative braking force with respect to a target deceleration is compensated by a friction braking force. A regenerative braking force can be utilized at a maximum by preferentially generating the regenerative braking force and compensating a shortage of the regenerative braking force with a friction braking force. Accordingly, it is preferable in terms of improving fuel consumption. In this case, however, it is supposed that a delay until an actual output of a friction braking force may become relatively large because the friction braking force is defined based on the regenerative braking force. By matching the rise timings of the braking force in the regeneration preference mode and the regeneration prohibition mode to each other, a variation in brake feeling between the two modes can be suppressed to a minimum level while the advantage of improving fuel consumption by the regeneration preference mode is being enjoyed.

The control unit may calculate a temporary target deceleration in accordance with a brake operation by a driver, so that, in the regeneration prohibition mode, a friction braking force is generated based on a target deceleration obtained by processing the temporary target deceleration with a first low-pass filter, and in the regeneration permission mode, the total braking force is generated based on a target deceleration obtained by processing the temporary target deceleration with a second low-pass filter whose upper limit of the passing frequency band is smaller than that of the first low-pass filter. By making a filtering process performed on the target deceleration in the regeneration permission mode different from that in the regeneration prohibition mode, as stated above, desired delay adjustment can be performed.

In the regeneration prohibition mode, the control unit may permit, to the friction braking force, increase speed larger than that in the regeneration permission mode. Thereby, a response delay of the friction braking force can be reduced in the regeneration prohibition mode, in comparison with that in the regeneration permission mode. A so-called "sticking feeling" can be provided in the rise of a braking force. Accordingly, a sense of discomfort that braking start is delayed can be reduced in the regeneration prohibition mode in comparison with the regeneration permission mode.

When determining whether a brake operation by a driver is a sudden brake and determining that is a sudden brake, the control unit may reduce the delay. Thereby, a braking force for an emergency can be preferentially secured by distinguishing normal time from emergency time.

The control unit may adjust the response property of the regenerative braking force outputted by the regenerative brake unit based on a physical amount by which the sensitivity of a driver to a variation in a vehicle deceleration is affected. The control unit may define the response property of the regenerative braking force to be higher in an insensitive range where the sensitivity of a driver is relatively low than that in a sensitive range where the sensitivity of the driver is relatively high. For example, the control unit may permit a large increase speed of a regenerative braking force when the increase speed of a target deceleration is large, in comparison with when the increase speed thereof is small. In addition, the control unit may permit a large increase speed of a regenerative braking force when a vehicle is moving at high speed in comparison with when the vehicle is moving at low speed. Thereby, the regenerative braking force can be swiftly increased toward the target value when the physical amount is in the insensitive range. Accordingly, the improvement in fuel consumption by a regenerative braking force and suppression of a variation in brake feeling can be both satisfied.

When the regeneration prohibition mode is switched to the regeneration permission mode during braking, the control unit may limit the increase speed of a regenerative braking force, occurring immediately after the switching. Thereby, an accidental increase in the regenerative braking force, occurring during the transition to the regeneration permission mode, can be suppressed and a sense of discomfort that can be provided to a driver can be reduced.

Another embodiment of the present invention is a brake control method for controlling a braking force by using a regenerative braking force and a friction braking force in combination. In this method, the braking force is controlled by selecting one of a plurality of control modes including both a regeneration permission mode in which the regenerative braking force and the friction braking force are generated based on a regenerative target value and a friction target value that are defined based on a target deceleration, and a regeneration prohibition mode in which the target deceleration is generated by the friction braking force. In the regeneration permission mode, a delay is provided to at least the friction braking force, and in the regeneration prohibition mode, a delay smaller than the above delay is provided to the friction braking force or a delay is not provided.

A brake control system according to still another embodiment of the present invention comprises: a friction brake unit configured to generate a friction braking force; a regenerative brake unit configured to generate a regenerative braking force; and a control unit configured to control the friction brake unit and the regenerative brake unit such that the regenerative braking force is preferentially generated and the friction braking force is complementarily generated for a braking request. The control unit adjusts delays of both the regenerative braking force and the friction braking force such that the divergence of each of the regenerative braking force and the friction braking force from a target distribution profile is reduced.

Thereby, the control unit can control the regenerative braking force and the friction braking force according to a desired distribution profile. By adjusting the delays of both the regenerative braking force and the friction braking force, a reduction amount of the regenerative braking force can be reduced in comparison with the case where a delay is unilaterally provided to the regenerative braking force. Further, a difference in brake feeling, occurring depending on the presence/absence of a regenerative braking force, can also be reduced to a minimum level by adjusting the delays.

Advantage of the Invention

According to the present invention, an excellent fuel consumption performance and a good brake feeling can be both satisfied in a brake control system and a brake control method in which regenerative braking is used in combination.

BRIEF DESCRIPTION OF THE DRAWINGS

FIGS. 4A to 4D are graphs schematically illustrating an example of the time change in the braking force in the brake regeneration cooperative control;

REFERENCE NUMERALS

Figure 1:
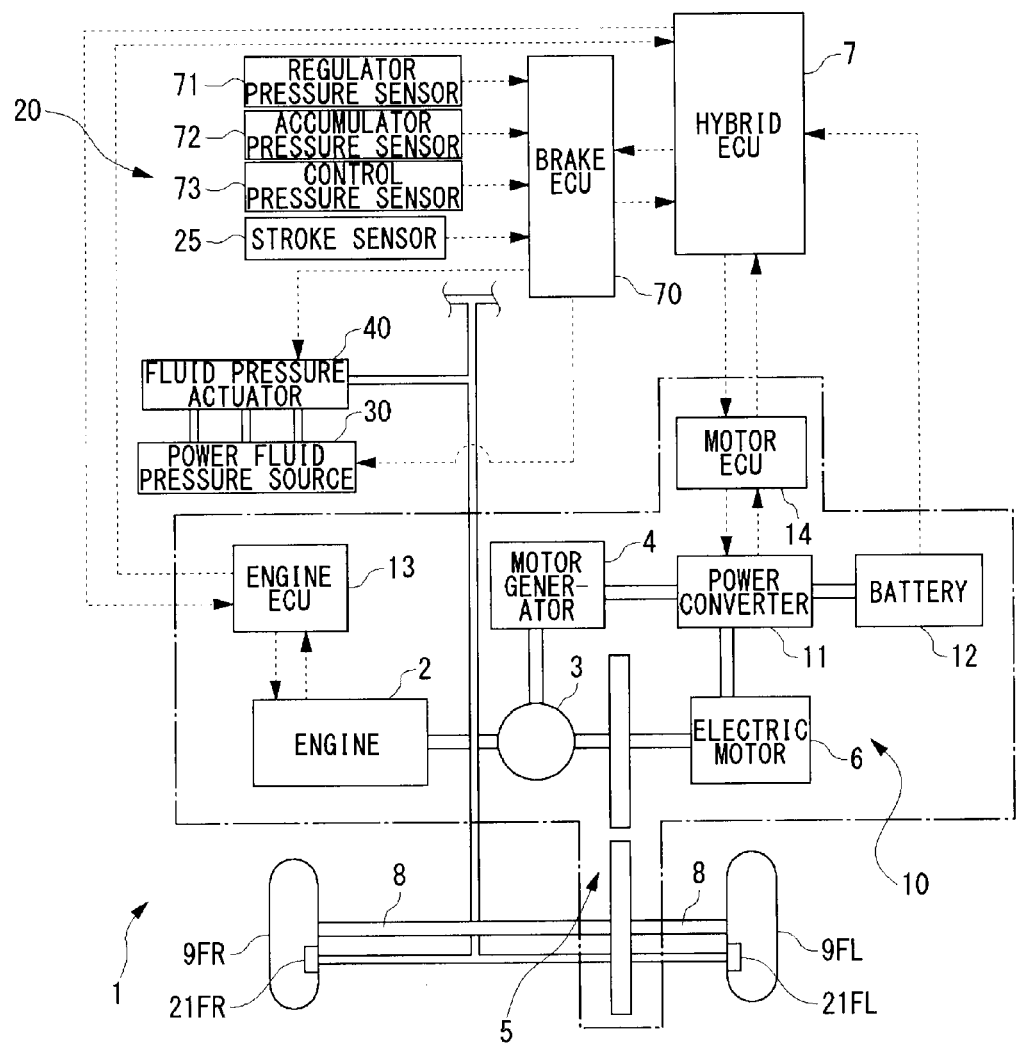
FIG. 1 is a view illustrating the schematic configuration of a vehicle to which a brake control system according to an embodiment of the present invention is applied.

6 ELECTRIC MOTOR
7 HYBRID ECU
10 REGENERATIVE BRAKE UNIT

12 BATTERY
14 MOTOR ECU
20 FLUID PRESSURE BRAKE UNIT
23 WHEEL CYLINDER
27 MASTER CYLINDER UNIT
31 FLUID PRESSURE BOOSTER
32 MASTER CYLINDER
33 REGULATOR
34 RESERVOIR
60 ISOLATION VALVE
64 MASTER CUT VALVE
65 REGULATOR CUT VALVE
66 PRESSURE-INCREASING LINEAR CONTROL VALVE
67 PRESSURE-REDUCING LINEAR CONTROL VALVE
70 BRAKE ECU
71 REGULATOR PRESSURE SENSOR
72 ACCUMULATOR PRESSURE SENSOR
73 CONTROL PRESSURE SENSOR

BEST MODE FOR CARRYING OUT THE INVENTION

In an embodiment according to the present invention, a brake control system comprehensively delays a braking force for a braking request. For example, a control unit in the brake control system delays both of a regenerative braking force and a friction braking force by performing a delay process on a target deceleration. The delay process is executed at least in the initial stage of occurrence of a braking request. In addition, the delay process is set so as to harmonize the brake feeling when the regenerative braking force is used with that when the regenerative braking force is not used. In the brake control system, the response property of the regenerative braking force is generally made higher than that of the friction braking force. Accordingly, in a regeneration cooperative control, a time difference in the rise timings of braking force, occurring between when the regenerative braking force is used and when it is not used, can be reduced by delaying both the regenerative braking force and the friction braking force.

In this case, the control unit may distribute a required braking force into the regenerative braking force and the friction braking force according to a target distribution profile at which the distribution of the regenerative braking force is maximized, and may control the regenerative braking force and the friction braking force. For example, the control unit preferentially generates the regenerative braking force and complementarily generates the friction braking force so as to meet the required braking force. By using a relatively large amount of regenerative braking, the recovery efficiency of a regenerative energy can be enhanced.

Thereby, it becomes possible to utilize the regenerative braking force at a maximum and minimize a difference in brake feeling, occurring depending on the presence/absence of the regenerative braking force. Unlike a trade-off method in which a brake feeling is improved by imposing a limit on the regenerative braking force, an excellent fuel consumption performance and a good brake feeling can be both achieved.

For example, the generalization as described below can be made. In an embodiment, a brake control system may comprise: a first brake unit; a second brake unit configured to output a braking force having a response property different from that in the first brake unit; and a control unit configured to control the braking force by preferentially using the output of the first brake unit and by using the output of the second brake unit in combination. The control unit may differentiate, from each other, a delay between the outputs of the second brake unit, occurring when the first brake unit is used and when it is not used. Thereby, a lag between the rise timings of the braking force, occurring due to the difference between the response properties of the first and second brake units depending on when the first brake unit is used and when it is not used, can be reduced.

The first brake unit may be one configured to generate the braking force having a response property higher than that in the second brake unit. Also, the control unit may provide delays to the braking forces outputted by the first and second brake units when the first brake unit is used, while may provide a delay smaller than the above delay to the braking force outputted by the second brake unit or may not provide a delay thereto when the first brake unit is not used. The first brake unit may be a regenerative brake unit and the second brake unit may be a friction brake unit. Thereby, a lag between the rise timings of the braking force, occurring between when the first brake unit is used and when it is not used, can be reduced without imposing a limit on the output of the first brake unit.

On the contrary, the first brake unit may be one configured to generate the braking force having a response property lower than that in the second brake unit. When the first brake unit is used, the control unit may provide a first delay to the braking force outputted by the first brake unit and provide a second delay larger than the first delay to the braking force outputted by the second brake unit. Alternatively, when the first brake unit is used, the control unit may provide a delay to the braking force outputted by the second brake unit without providing a delay to the braking force outputted by the first brake unit. When the first brake unit is not used, the control unit may provide a delay, smaller than that occurring when the first brake unit is used, to the braking force outputted by the second brake unit or may not provide a delay thereto. For example, the first brake unit may be an engine brake unit and the second brake unit may be a friction brake unit. Thereby, engine braking can be used preferentially, and hence the progression of the wear in the friction brake unit can be slowed down.

In an embodiment, the control unit may adjust the delays of the outputs of both the first and second brake units such that the distribution ratio of the output of the first brake unit to a total output is larger than that before adjustment. For example, the control unit may adjust the delays of both the regenerative braking force and the friction braking force such that the divergence of each of the regenerative braking force and the friction braking force from a target distribution profile is reduced. The distribution profile may be set so as to maximize the distribution of the regenerative braking force under a predetermined constraint condition. For example, the distribution of the regenerative braking force may be maximized by taking the residue, obtained by subtracting an actually-outputted regenerative braking force from the required braking force, as a friction braking force target value.

In a further generalization, a vehicle control system according to an embodiment may comprise a plurality of control units each outputting a force having a response property different from the others that acts on a vehicle, and may be configured to generate a total output from the outputs of the plurality control units. The priorities of the plurality of control units may be set with respect to the output distribution in the total output. The vehicle control system may adjust the delay amounts of the outputs of the plurality of control units such that the ratio of the output of the control unit, the priority of which is set to be relatively high, to the total output is larger than that before adjustment.

The delay amount of the output of each control unit is set by being associated with the priority thereof. The vehicle control system may selectively use a control unit whose priority is relatively high. The vehicle control system may differentiate, from each other, the delay amounts of the output of a control unit whose priority is relatively low, occurring when a control unit whose priority is relatively high is used and when the control unit is not used. The delay amount of the output of a control unit whose priority is relatively low may be increased when a control unit whose priority is relatively high is used in comparison with when the control unit is not used.

FIG. 1 is a view illustrating the schematic configuration of a vehicle to which a brake control system according to an embodiment of the present invention is applied. The vehicle 1 illustrated in the view is formed as a so-called hybrid vehicle, and comprises: an engine 2; a 3-shaft power division mechanism 3 connected to a crankshaft, an output axis of the engine 2; a motor generator 4 by which power can be generated, connected to the power division mechanism 3; an electric motor 6 connected to the power division mechanism 3 via a transmission 5; and an electronic control unit 7 for a hybrid vehicle (hereinafter, referred to as a "hybrid ECU", and every electronic control unit is referred to as an "ECU"), which controls the whole drive system of the vehicle 1. A right front wheel 9FR and a left front wheel 9FL, which are drive wheels of the vehicle 1, are connected to the transmission 5 via a drive shaft 8.

The engine 2 is an internal combustion engine operated by using a hydrocarbon fuel, such as, for example, gasoline, gas oil, or the like, and is controlled by an engine ECU 13. The engine ECU 13 can communicate with the hybrid ECU 7, and executes a fuel injection control, an ignition control, and an intake control, etc., of the engine 2 based on a control signal from the hybrid ECU 7 and signals from various sensors for detecting operating states of the engine 2. The engine ECU 13 provides information on the operating states of the engine 2 to the hybrid ECU, if necessary.

The power division mechanism 3 plays: the role of communicating the output of the electric motor 6 to the right and left front wheels 9FR and 9FL via the transmission 5; the role of distributing the output of the engine 2 to the motor generator 4 and the transmission 5; and the role of decelerating or accelerating the rotational speed of the electric motor 6 or the engine 2. Each of the motor generator 4 and the electric motor 6 is connected to a battery 12 via a power converter 11 including an inverter, and a motor ECU 14 is connected to the power converter 11. A storage battery, such as, for example, a nickel-hydrogen storage battery, can be used as the battery 12. The motor ECU 14 can also communicate with the hybrid ECU 7 and controls, via the power converter 11, the motor generator 4 and the electric motor 6 based on a control signal from the hybrid ECU 7, etc. Each of the aforementioned hybrid ECU 7, engine ECU 13, and motor ECU 14 is formed as a microprocessor including a CPU, and includes a ROM for storing various programs, a RAM for temporarily storing data, an input/output port, and a communication port, etc., in addition to the CPU.

The right and left front wheels 9FR and 9FL can be driven by an output of the electric motor 6 under the control of the hybrid ECU 7 and the motor ECU 14, while power is being supplied from the battery 12 to the electric motor 6 via the power converter 11. The vehicle 1 is driven by the engine 2 in an operating area where the engine operates at a good efficiency. At the time, by communicating part of the output of the engine 2 to the motor generator 4 via the power division mechanism 3, it becomes possible to drive the electric motor 6 by using the power generated by the motor generator 4 or to charge the battery 12 via the power converter 11.

While the vehicle 1 is being braked, the electric motor 6 is rotated by the power communicated from the front wheels 9FR and 9FL under the control of the hybrid ECU and the motor ECU 14, so that the electric motor 6 is operated as a power generator. That is, the electric motor 6, the power converter 11, the hybrid ECU 7, and the motor ECU 14, etc., function as a regenerative brake unit 10 that provides the braking force to the right and left front wheels 9FR and 9FL by regenerating the kinetic energy of the vehicle 1 to an electric energy.

The brake control system according to an embodiment generates a required braking force by executing a brake regeneration cooperative control in which the regenerative braking force and the friction braking force are used in combination. The regenerative braking force means a braking force provided to a wheel by operating an electric motor for driving the wheel as a power generator in which the rotating torque of a moving wheel is inputted. The kinetic energy of the vehicle is converted into an electric energy, and the electric energy is accumulated in the storage battery by being communicated from the electric motor via the power converter including an inverter, etc. The accumulated electric energy is used for the subsequent drive of wheels, etc., thereby contributing to the improvement in the fuel consumption of a vehicle. On the other hand, the friction braking force means a braking force provided to a wheel by pressing a friction member against a rotating member that is rotated with the wheel. Hereinafter, the fluid pressure braking force generated by pressing the friction member against the rotating member with the supply of an operating fluid from a fluid pressure source will be described as an example of the friction braking force. In order to improve the fuel consumption to a higher level, it is desirable to preferentially use the regenerative braking force and to complementarily generate, by the fluid pressure braking force, a braking force corresponding to a shortage for the required braking force, occurring when only the regenerative braking force is used.

Figure 2:
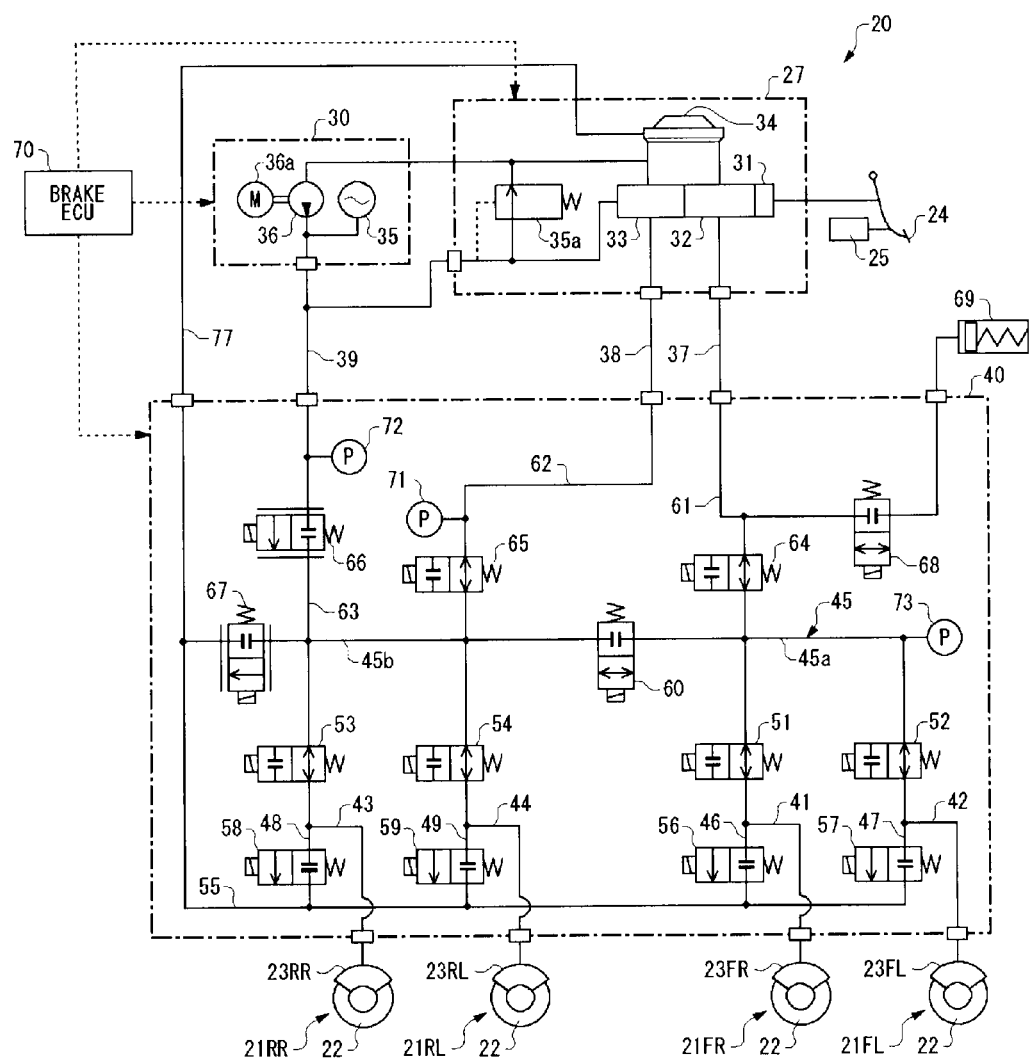
FIG. 2 is a systematic view illustrating a fluid pressure brake unit according to an embodiment of the invention.

As illustrated in FIG. 2, the vehicle 1 comprises a fluid pressure brake unit 20 configured to generate the braking force by supplying the operating fluid from a power fluid pressure source 30, etc., in addition to the regenerative brake unit 10. In the vehicle 1, a desired braking force can be generated by using the regenerative braking force and the fluid pressure braking force in combination, with a brake regeneration cooperative control being executed.

FIG. 2 is a systematic view illustrating the fluid pressure brake unit 20 according to the present embodiment. As illustrated in FIG. 2, the fluid pressure brake unit 20 includes: disc brake units 21FR, 21FL, 21RR, and 21RL, all of which are provided to correspond to respective wheels; a master cylinder unit 27, the power fluid pressure source 30; and a fluid pressure actuator 40.

The disc brake units 21FR, 21FL, 21RR, and 21RL provide braking forces to the right front wheel, left front wheel, right rear wheel, and left rear wheel of the vehicle, respectively. The master cylinder unit 27 according to the present embodiment, as a manual fluid pressure source, sends out brake fluid to the disc brake units 21FR to 21RL, the pressure of the brake fluid being increased in accordance with an operation amount of a brake pedal 24, as a brake operating member, by a driver. The power fluid pressure source 30 can send out, to the disc brake units 21FR to 21RL, the brake fluid as an operating fluid independently of the operation of the brake pedal 24 by a driver, the pressure of the brake fluid being increased by the supply of power. The fluid pressure actuator 40 appropriately adjusts the pressure of the brake fluid supplied from the power fluid pressure source 30 or the master cylinder unit 27, and sends out the brake fluid to the disc brake units 21FR to 21RL. Thereby, the braking force for each wheel by fluid pressure braking can be adjusted.

Hereinafter, each of the disc brake units 21FR to 21RL, the master cylinder unit 27, the power fluid pressure source 30, and the fluid pressure actuator 40 will be described in more detail. The disc brake units 21FR to 21RL include a brake disk 22 and the wheel cylinders 23FR to 23RL built into a brake caliper, respectively. Each of the wheel cylinders 23FR to 23RL is connected to the fluid pressure actuator 40 via a fluid channel different from that for another wheel cylinder. Hereinafter, the wheel cylinders 23FR to 23RL will be appropriately and collectively referred to as a "wheel cylinder 23".

In each of the disc brake units 21FR to 21RL, a brake pad, as the friction member, is pressed against the brake disk 22 that is rotated with the wheel, when the brake fluid is supplied from the fluid pressure actuator 40 to the wheel cylinder 23. Thereby, the braking force id provided to each wheel. In the present embodiment, the disk brake units 21FR to 21RL are used; however, another braking force providing mechanism including the wheel cylinder 23, such as, for example, a drum brake, may be used.

In the present embodiment, the master cylinder unit 27 is a master cylinder with a fluid pressure booster and includes a fluid pressure booster 31, a master cylinder 32, a regulator 33, and a reservoir 34. The fluid pressure booster 31 is connected to the brake pedal 24 to communicate a pedal tread force applied onto the brake pedal 24 to the master cylinder 32 after amplifying the tread force. By the brake fluid being supplied from the power fluid pressure source 30 to the fluid pressure booster 31 via the regulator 33, the pedal tread force is amplified. The master cylinder 32 generates a master cylinder pressure with a predetermined multiplication ratio with respect to the pedal tread force.

The reservoir 34 for reserving the brake fluid is arranged above the master cylinder 32 and the regulator 33. The master cylinder 32 communicates with the reservoir 34 when the stepping-on of the brake pedal 24 is cancelled. On the other hand, the regulator 33 communicates with both the reservoir 34 and an accumulator 35 of the power fluid pressure source 30 to make the reservoir 34 to be a low-pressure source and the accumulator 35 to be a high-pressure source, thereby allowing a fluid pressure almost the same as the master cylinder pressure to be generated. Hereinafter, the fluid pressure in the regulator 33 is appropriately referred to as a "regulator pressure". It is not needed to make the master cylinder pressure and the regulator pressure to be accurately the same as each other, and it is also possible to design the master cylinder unit 27 such that, for example, the regulator pressure is slightly higher than the master cylinder pressure.

The power fluid pressure source 30 includes the accumulator 35 and a pump 36. The accumulator 35 converts the pressure energy of the brake fluid whose pressure has been increased by the pump 36 into the pressure energy of a filler gas, such as nitrogen, for example, into approximately 14 to 22 MPa, and accumulates the energy. The pump 36 has a motor 36a as a driving source, and the suction port of the pump is connected to the reservoir 34, while the discharge port thereof is connected to the accumulator 35. The accumulator 35 is also connected to a relief valve 35a provided in the master cylinder unit 27. If the pressure of the brake fluid in the accumulator 35 is abnormally increased to, for example, approximately 25 MPa, the relief valve 35a is opened to return the high-pressure brake fluid into the reservoir 34.

As stated above, the fluid pressure brake unit 20 has the master cylinder 32, the regulator 33, and the accumulator 35, as a supply source of the brake fluid to the wheel cylinder 23. A master pipe 37, a regulator pipe 38, and an accumulator pipe 39 are connected to the master cylinder 32, the regulator 33, and the accumulator 35, respectively. Each of the master pipe 37, the regulator pipe 38, and the accumulator pipe 39 is connected to the fluid pressure actuator 40.

The fluid pressure actuator 40 includes both an actuator block in which a plurality of channels are formed and a plurality of electromagnetic control valves. The channels formed in the actuator block include individual channels 41, 42, 43, and 44 and a main channel 45. The individual channels 41 to 44 are respectively branched from the main channel 45 to be respectively connected to the wheel cylinders 23FR, 23FL, 23RR, and 23RL of the corresponding disc brake units 21FR, 21FL, 21RR, and 21RL. Thereby, each wheel cylinder 23 can communicate with the main channel 45.

ABS holding valves 51, 52, 53, and 54 are provided in the middle of the individual channels 41, 42, 43, and 44, respectively. Each of the ABS holding valves 51 to 54 has a solenoid on which an ON/OFF-control is performed and a spring, and is a normally-open electromagnetic control valve that is opened when the solenoid is not powered. Each of the ABS holding valves 51 to 54, in an open state, can distribute the brake fluid bidirectionally. That is, it becomes possible to make the brake fluid flow from the main channel 45 to the wheel cylinder 23, and vice versa, from the wheel cylinder 23 to the main channel 45. When the solenoid is powered and each of the ABS holding valves 51 to 54 is closed, the distribution of the brake fluid is blocked in the individual channels 41 to 44.

The wheel cylinder 23 is further connected to a reservoir channel 55 via pressure-reducing channels 46, 47, 48, and 49 respectively connected to the individual channels 41 to 44. Each of ABS pressure-reducing valves 56, 57, 58, and 59 is provided in the middle of each of the pressure-reducing channels 46, 47, 48, and 49. Each of the ABS pressure-reducing valves 56 to 59 has a solenoid on which an ON/OFF-control is performed and a spring, and is a normally-closed electromagnetic control valve that is closed when the solenoid is not powered. When each of the ABS pressure-reducing valves 56 to 59 is closed, the distribution of the brake fluid is blocked in the pressure-reducing channels 46 to 49. When the solenoid is powered to open each of the ABS pressure-reducing valves 56 to 59, the distribution of the brake fluid is permitted in the pressure-reducing channels 46 to 49, so that the brake fluid is refluxed into the reservoir 34 from the wheel cylinder 23 via the pressure-reducing channels 46 to 49 and the reservoir channel 55. The reservoir channel 55 is connected to the reservoir 34 in the master cylinder unit 27 via the reservoir pipe 77.

The main channel 45 has an isolation valve 60 in the middle thereof. The main channel 45 is divided, by this isolation valve 60, into a first channel 45a to be connected to the individual channels 41 and 42 and a second channel 45b to be connected to the individual channels 43 and 44. The first channel 45a is connected to the wheel cylinders 23FR and 23FL for front wheels via the individual channels 41 and 42, while the second channel 45b is connected to the wheel cylinders 23RR and 23RL for rear wheels via the individual channels 43 and 44.

The isolation valve 60 has a solenoid on which an ON/OFF-control is performed and a spring, and is a normally-closed electromagnetic control valve that is closed when the solenoid is not powered. When the isolation valve 60 is in a closed state, the distribution of the brake fluid is blocked in the main channel 45. When the solenoid is powered to open the isolation valve 60, the brake fluid can be distributed bidirectionally between the first channel 45a and the second channel 45b.

A master channel 61 and a regulator channel 62 both communicating with the main channel 45 are formed in the fluid pressure actuator 40. In more detail, the master channel 61 is connected to the first channel 45a of the main channel 45 and the regulator channel 62 is connected to the second channel 45b thereof. The master channel 61 is connected to the master pipe 37 communicating with the master cylinder 32. The regulator channel 62 is connected to the regulator pipe 38 communicating with the regulator 33.

The master channel 61 has a master cut valve 64 in the middle thereof. The master cut valve 64 is provided in a supply channel of the brake fluid from the master cylinder 32 to each wheel cylinder 23. The master cut valve 64 has a solenoid on which an ON/OFF-control is performed and a spring, and is a normally-open electromagnetic control valve that is opened when the solenoid is not powered, a closed state of the master cut valve 64 being ensured by the electromagnetic force generated by the solenoid when receiving a supply of a specified control current. When opened, the master cut valve 64 can distribute the brake fluid bidirectionally between the master cylinder 32 and the first channel 45a of the main channel 45. When the master cut valve 64 is closed by the solenoid being powered with the specified control current, the distribution of the brake fluid is blocked in the master channel 61.

A stroke simulator 69 is connected, on the upstream side from the master cut valve 64, to the master channel 61 via a simulator cut valve 68. That is, the simulator cut valve 68 is provided in the channel connecting the master cylinder 32 and the stroke simulator 69. The simulator cut valve 68 has a solenoid on which an ON/OFF-control is performed and a spring, and is a normally-closed electromagnetic control valve that is closed when the solenoid is not powered, an open state of the simulator cut valve 68 being ensured by the electromagnetic force generated by the solenoid when receiving a supply of a specified control current. When the simulator cut valve 68 is in a closed state, the distribution of the brake fluid is blocked between the master channel 61 and the stroke simulator 69. When the simulator cut valve 68 is opened by the solenoid being powered, the brake fluid can be distributed bidirectionally between the master cylinder 32 and the stroke simulator 69.

The stroke simulator 69 includes a plurality of pistons and springs to create a reactive force in accordance with the tread force on the brake pedal 24 by a driver when the simulator cut valve 68 is released. In order to improve a feeling in a bake operation by a driver, it is preferable to adopt, as the stroke simulator 69, a stroke simulator having multi-stage spring properties.

The regulator channel 62 has a regulator cut valve 65 in the middle thereof. The regulator cut valve 65 is provided in a supply channel of the brake fluid from the regulator 33 to each wheel cylinder 23. The regulator cut valve 65 also has a solenoid on which an ON/OFF control is performed and a spring, and is a normally-open electromagnetic control valve that is opened when the solenoid is not powered, a closed state of the regulator cut valve 64 being ensured by the electromagnetic force generated by the solenoid when receiving a supply of a specified control current. When opened, the regulator cut valve 65 can distribute the brake fluid bidirectionally between the regulator 33 and the second channel 45b of the main channel 45. When the regulator cut valve 65 is closed by the solenoid being powered, the distribution of the brake fluid is blocked in the regulator channel 62.

An accumulator channel 63 is also formed in the fluid pressure actuator 40, in addition to the master channel 61 and the regulator channel 62. One end of the accumulator channel 63 is connected to the second channel 45b of the main channel 45, while the other end thereof is connected to the accumulator pipe 39 communicating with the accumulator 35.

The accumulator channel 63 has a pressure-increasing linear control valve 66 in the middle thereof. The accumulator channel 63 and the second channel 45b of the main channel 45 are connected to the reservoir channel 55 via a pressure-reducing linear control valve 67. Each of the pressure-increasing linear control valve 66 and the pressure-reducing linear control valve 67 has a linear solenoid and a spring, and is a normally-closed electromagnetic control valve that is closed when the solenoid is not powered. The valve opening angle of each of the pressure-increasing linear control valve 66 and the pressure-reducing linear control valve 67 is adjusted to be proportionate to a current supplied to each solenoid.

The pressure-increasing linear control valve 66 is provided as a common pressure-increasing control valve among each of the multiple wheel cylinders 23 provided so as to correspond to each of the wheels. Similarly, the pressure-reducing linear control valve 67 is also provided as a common pressure-reducing control valve among each of the multiple wheel cylinders 23. That is, in the present embodiment, the pressure-increasing linear control valve 66 and the pressure-reducing linear control valve 67 are provided as a pair of common control valves for controlling the supply/discharge of the operating fluid that is sent out from the power fluid pressure source 30 to/from each of the wheel cylinders 23. It is preferable in terms of cost that the pressure-increasing linear control valve 66 and the pressure-reducing linear control valve 67 are provided so as to be common among each of the wheel cylinders 23, as stated above, in comparison with the case where a linear control valve is provided for every wheel cylinder 23.

Herein, the differential pressure between the inlet port and the outlet port of the pressure-increasing linear control valve 66 corresponds to the differential pressure between the pressure of the brake fluid in the accumulator 35 and that in the main channel 45, while the differential pressure between the inlet port and the outlet port of the pressure-reducing linear control valve 67 corresponds to the differential pressure between the pressure of the brake fluid in the main channel 45 and that in the reservoir 34. When it is assumed that an electromagnetic drive force, corresponding to the supply power to the linear solenoid of each of the pressure-increasing linear control valve 66 and the pressure-reducing linear control valve 67, is F1; the biasing force of the spring is F2; and a differential pressure acting force, corresponding to the differential pressure between the inlet port and the outlet port of each of the pressure-increasing linear control valve 66 and the pressure-reducing linear control valve 67, is F3, the relationship of F1+F3=F2 is satisfied. Accordingly, by continuously controlling the supply power to the linear solenoid of each of the pressure-increasing linear control valve 66 and the pressure-reducing linear control valve 67, the differential pressure between the inlet port and the outlet port of each of the pressure-increasing linear control valve 66 and the pressure-reducing linear control valve 67 can be controlled.

In the fluid pressure brake unit 20, the power fluid pressure source 30 and the fluid pressure actuator 40 are controlled by the brake ECU 70. The brake ECU 70 is formed as a microprocessor including a CPU, and includes a ROM for storing various programs, a RAM for temporarily storing data, an input/output port, and a communication port, etc., in addition to the CPU. The brake ECU 70 can communicate with the higher-level hybrid ECU 7, etc., to control the pump 36 of the power fluid pressure source 30 and the electromagnetic control valves 51 to 54, 56 to 59, 60, and 64 68, all of which forms the fluid pressure actuator 40, based on a control signal from the hybrid ECU and signals from various sensors.

A regulator pressure sensor 71, an accumulator pressure sensor 72, and a control pressure sensor 73 are connected to the brake ECU 70. The regulator pressure sensor 71 detects, on the upstream side from the regulator cut valve 65, the pressure of the brake fluid in the regulator channel 62, i.e., the regulator pressure, and provides a signal indicating the detected pressure to the brake ECU 70. The accumulator pressure sensor 72 detects, on the upstream side from the pressure-increasing linear control valve 66, the pressure of the brake fluid in the accumulator channel 63, i.e., the accumulator pressure, and provides a signal indicating the detected pressure to the brake ECU 70. The control pressure sensor 73 detects the pressure of the brake fluid in the first channel 45*a* of the main channel 45, and provides a signal indicating the detected pressure to the brake ECU 70. The pressure detected by each of the pressure sensors 71 to 73 is sequentially provided to the brake ECU 70 at predetermined intervals to be stored and held in a predetermined storage area of the brake ECU 70.

When the first channel 45*a* and the second channel 45*b* of the main channel 45 communicate with each other by the isolation valve 60 being opened, the output value of the control pressure sensor 73 indicates the fluid pressure on the lower pressure side of the pressure-increasing linear control valve 66 and also indicates the fluid pressure on the higher pressure side of the pressure-reducing linear control valve 67. Accordingly, the output value can be used for the control of the pressure-increasing linear control valve 66 and the pressure-reducing linear control valve 67. When the pressure-increasing linear control valve 66 and the pressure-reducing linear control valve 67 are closed and when the master cut valve 64 is opened, the output value of the control pressure sensor 73 indicates the master cylinder pressure. Further, when the first channel 45*a* and the second channel 45*b* of the main channel 45 communicate with each other by the isolation valve 60 being opened such that each of the ABS holding valves 51 to 54 is opened, and when each of the ABS pressure-reducing valves 56 to 59 is closed, the output value of the control pressure sensor 73 indicates an operating fluid pressure that acts on each of the wheel cylinders 23, i.e., a wheel cylinder pressure.

Further, a stroke sensor 25 provided in the brake pedal 24 is also included in the sensors connected to the brake ECU 70. The stroke sensor 25 detects a pedal stroke as an operation amount of the brake pedal 24, and provides a signal indicating the detected stroke to the brake ECU 70. The output value of the stroke sensor 25 is also sequentially provided to the brake ECU 70 at predetermined intervals to be stored and held in a predetermined storage area of the brake ECU. Alternatively, a means for detecting an operating state of the brake, other than the stoke sensor 25, may be provided and connected to the brake ECU 70, in addition to the stroke sensor 25 or instead thereof. Examples of the means for detecting an operating state of the brake include, for example, a pedal tread force sensor for detecting an operating force of the brake pedal 24, and a brake switch for detecting the fact that the brake pedal 24 has been stepped on, etc.

Figure 3:
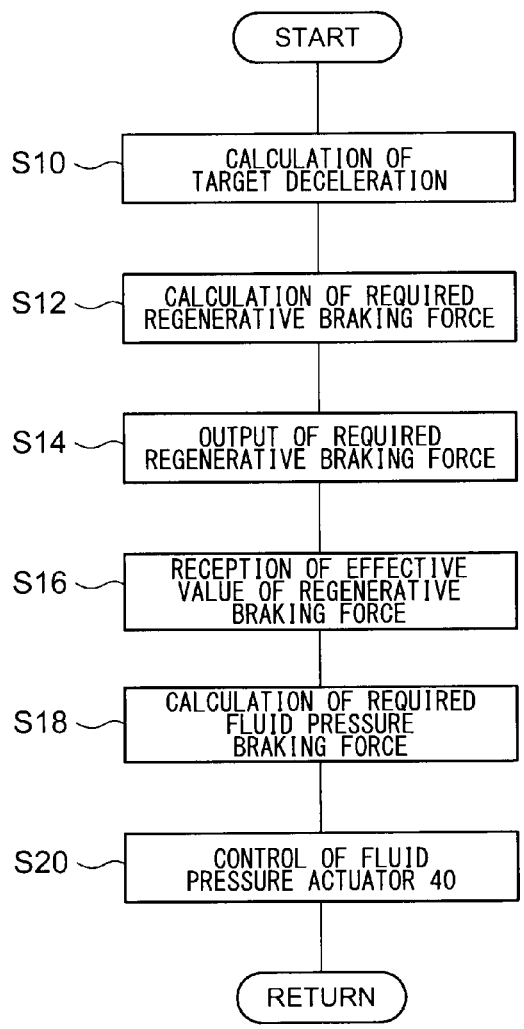
FIG. 3 is a flowchart for explaining an example of a regeneration cooperative control process according to an embodiment of the invention.

The brake control system according to the present embodiment, provided with the fluid pressure brake unit 20 formed as stated above, can execute a brake regeneration cooperative control. FIG. 3 is a flowchart for explaining an example of the regeneration cooperative control process. When receiving a braking request, the brake ECU 70 starts the process. The braking request is created when the braking force should be provided to a vehicle, such as, for example, when a driver operates the brake pedal 24. The brake ECU 70 repeatedly executes the process at predetermined control cycles before, for example, an operation of the brake pedal 24 is cancelled.

When receiving the braking request, the brake ECU 70 calculates a target deceleration, i.e., a required braking force (S10). The brake ECU 70 calculates the target deceleration based on, for example, measured values of a master cylinder pressure and a stroke. Herein, the brake ECU 70 may calculate a target braking force for each wheel by distributing the target deceleration to each wheel according to the desired braking force distribution, and in the subsequent processes, the brake ECU 70 may control the regenerative braking force and the friction braking force based on the target braking force.

The brake ECU 70 calculates a required regenerative braking force based on the target deceleration (S12). For example, when the target deceleration is smaller than a regenerable maximum braking force, the brake ECU 70 takes the target deceleration as a required regenerative braking force, and when the target deceleration is larger than or equal to the regenerable maximum braking force, the brake ECU 70 takes the regenerable maximum braking force as the required regenerative braking force. Alternatively, the brake ECU 70 may calculate the required regenerative braking force by correcting the target deceleration, not taking the target deceleration as the required regenerative braking force as it is. The required regenerative braking force may be corrected to be high with respect to the target deceleration, or conversely, may be corrected to be low. The brake ECU 70 transmits the calculated required regenerative braking force to the hybrid ECU 7 (S14). The brake ECU 70 and the hybrid ECU 7 are connected to the in-vehicle network. The brake ECU 70 transmits the required regenerative braking force to the in-vehicle network.

The hybrid ECU 7 receives the required regenerative braking force from the in-vehicle network. The hybrid ECU 7 controls the regenerative brake unit 10 by taking the received required regenerative braking force as a regenerative braking force target value. The hybrid ECU 7 transmits the effective value of the regenerative braking force, actually generated as a result of the control, to the brake ECU 70 through the in-vehicle network.

The brake ECU 70 receives the regenerative braking force effective value from the hybrid ECU 7 (S16). The brake ECU 70 calculates a required fluid pressure braking force, which is the braking force to be generated by the fluid pressure brake unit 20, by subtracting the regenerative braking force effective value from the target deceleration (S18). The brake ECU 70 calculates a target fluid pressure for each of the wheel cylinders 23FR to 23RL based on the required fluid pressure braking force. The brake ECU 70 may correct the required fluid pressure braking force or the target fluid pressure. The brake ECU 70 controls the fluid pressure actuator 40 such that the wheel cylinder pressure is equal to the target fluid pressure (S20). The brake ECU 70 defines, for example, by a feedback control, the value of the control current to be supplied to the pressure-increasing linear control valve 66 and the pressure-reducing linear control valve 67.

As a result, the brake fluid is supplied from the power fluid pressure source 30 to each wheel cylinder 23 via the pressure-increasing linear control valve 66 in the fluid pressure brake unit 20, thereby allowing the braking force to be provided to a wheel. In addition, the brake fluid is discharged from each wheel cylinder 23 via the pressure-reducing linear control valve 67, if necessary, thereby allowing the braking force to be provide to a wheel to be adjusted. In the present embodiment, a wheel cylinder pressure control system is formed to include the power fluid pressure source 30, the pressure-increasing linear control valve 66, and the pressure-reducing linear control valve 67, etc. A so-called brake-by-wire braking force control is executed by the wheel cylinder pressure control system. The wheel cylinder pressure control system is provided in parallel with the supply channel of the brake fluid from the master cylinder unit 27 to the wheel cylinder 23.

When the brake-by-wire braking force control is to be executed, the brake ECU 70 closes the regulator cut valve 65 such that the brake fluid sent out from the regulator 33 is not supplied to the wheel cylinder 23. Also, the brake ECU 70 closes the master cut valve 64 and opens the simulator cut valve 68. This is done in order that the brake fluid, which is sent out from the master cylinder 23 with an operation of the brake pedal 24 by a driver, is supplied to the stroke simulator 69, not to the wheel cylinder 23. During the brake regeneration cooperative control, a differential pressure corresponding to the magnitude of the regenerative braking force acts between the upstream and the downstream of each of the regulator cut valve 65 and the master cut valve 64.

In the aforementioned brake regeneration cooperative control, the regenerative braking force is preferentially generated and a shortage of the regenerative braking force with respect to the required braking force is compensated by the friction braking force. However, the present invention is not limited to such a regeneration priority mode. For example, the control unit may control the braking force by a regeneration auxiliary mode in which the regenerative braking force is used in an auxiliary manner. Alternatively, the control unit may control the braking force by a regeneration-combined mode in which the regenerative braking force and the friction braking force are generated by distributing the target deceleration into a regenerative target value and a friction target value that have been set in advance.

FIGS. 4A to 4C are graphs schematically illustrating an example of the time change in the braking force in the brake regeneration cooperative control. Each of FIGS. 4A to 4C illustrates an example of the brake regeneration cooperative control, while FIG. 4D illustrates, for comparison, the case where the fluid pressure braking force is used, but the regenerative braking force is not used. The vertical axis in each of the views represents the braking force, while the horizontal axis represents an elapsed time from a regeneration request. Accordingly, the braking force rise in the initial stage of stepping-on of the brake pedal 24 is illustrated in each of the views. As an example of the time change in the required braking force, an example is illustrated in which the required braking force is increased linearly after a braking request and becomes constant after time $t_5$.

FIG. 4A illustrates the required braking force and the regenerative braking force. In this view, the required braking force is indicated by a solid line, the regenerative braking force target value is indicated by a dashed-dotted line, and an actual regenerative braking force is indicated by a dashed line. The regenerative braking force target value is increased so as to match the required braking force in the initial stage. There is some extent of a lag between when the regenerative braking force target value has been defined and when the regenerative braking force is actually outputted, although the lag is smaller than the response delay of the fluid pressure braking force. Accordingly, the actual regenerative braking force rises at a time delayed from the target value by time $t_1$. When the required braking force reaches the upper limit of the regenerative braking force at time $t_3$, the regenerative braking force target value becomes constant at the upper limit after time $t_3$. The actual regenerative braking force becomes constant after time $t_4$, following the target value.

FIG. 4B illustrates the required braking force and the fluid pressure braking force. In this view, the required braking force and the fluid pressure braking force target value are indicated by solid lines, while an actual fluid pressure braking force is indicated by a dashed line. As stated above, the fluid pressure braking force target value can be obtained by subtracting an actual regenerative braking force from the required braking force. Accordingly, the fluid pressure braking force target value is increased before time $t_1$ when the regenerative braking force rises. After that, the fluid pressure braking force target value is maintained to be constant by the increase in the regenerative braking force. The fluid pressure braking force target value is increased again after time $t_4$ when the actual regenerative braking force has reached the upper limit. The fluid pressure braking force target value also becomes constant after time $t_5$ when the required braking force becomes constant. The increase in the actual fluid pressure braking force is initiated at time $t_2$ that is delayed from the increase in the target value.

The response delay of the fluid pressure braking force is generally larger than that of the regenerative braking force. The response delay of the fluid pressure braking force is, for example, 10 times or more larger than that of the regenerative braking force. One of the reasons for this is that there is the tendency of thinking that control stability is more important than the response property of a fluid pressure control in the fluid pressure brake unit 20. Another reason is that opening/closing of a control valve in the fluid pressure brake unit 20 is controlled gently to reduce an operating sound of the control valve. Still another reason is that, in the fluid pressure actuator 40 illustrated in FIG. 2, the fluid pressure control volume of the pressure-increasing linear control valve 66 is large because the pressure of the wheel cylinder 23 for four wheels is increased by a single pressure-increasing linear control valve 66.

FIG. 4C illustrates a change in a total braking force with respect to the required braking force. Herein, the total braking force means the total of the actual regenerative braking force illustrated in FIG. 4A and the actual fluid pressure braking force illustrated in FIG. 4B. The rise of the total braking force depends on the rise (time $t_1$) of the regenerative braking force having a quick response. On the other hand, when the required braking force is covered by the fluid pressure braking force, as illustrated in FIG. 4D, the fluid pressure braking force rises at a time delayed, by a time of $\Delta t$, from the rise time of the regeneration cooperative control illustrated in FIG. 4C, due to the response delay of the fluid pressure braking force. Usually, this delay does not cause a trouble in the braking performance of a vehicle. However, if the rise timing of the braking force varies depending on the presence/absence of the use of the regenerative braking force, as stated above, there is the fear that a driver may feel a sense of discomfort.

Figure 5A:
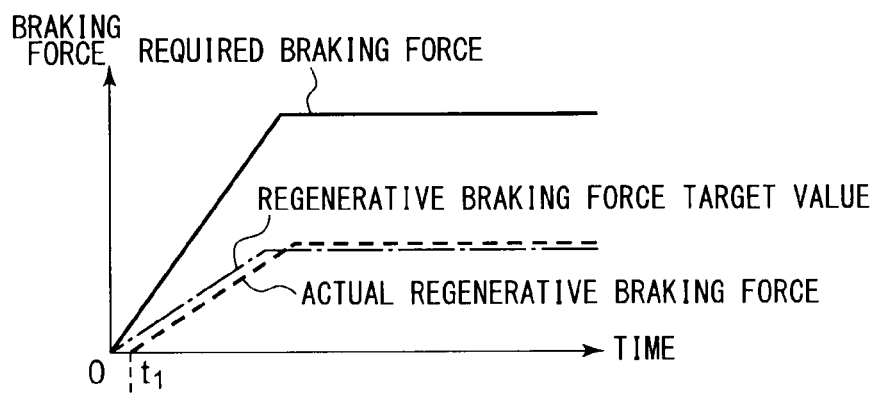
FIGS. 5A to 5C are graphs schematically illustrating another example of the time change in the braking force in the brake regeneration cooperative control.
Figure 5B:
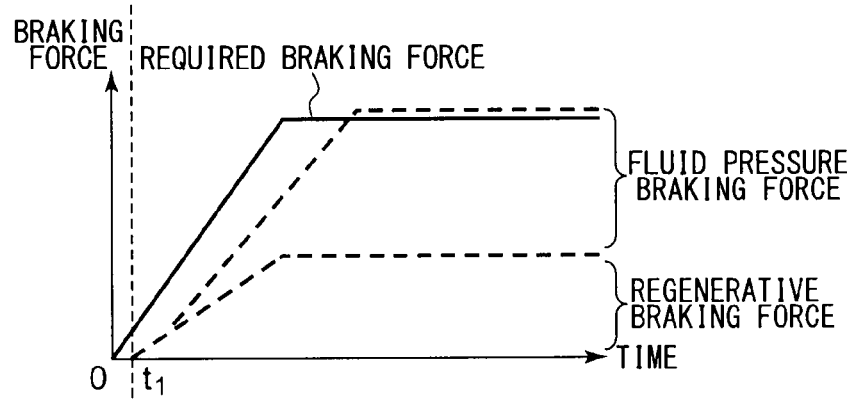
Figure 5C:
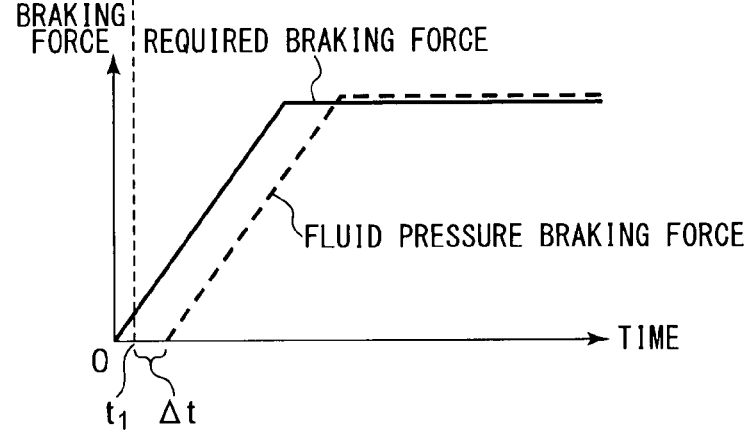

FIGS. 5A to 5B are graphs schematically illustrating another example of the time change in the braking force in the brake regeneration cooperative control. FIGS. 5A and 5B illustrate an example of the brake regeneration cooperative control, while FIG. 5C illustrates a comparative example. The comparative example in FIG. 5C is the same as that illustrated in FIG. 4D. Similarly to FIGS. 4A to 4D, the vertical axis and horizontal axis in each of FIGS. 5A to 5C represent the braking force and time, respectively. The time change in the required braking force in each of FIGS. 5A to 5C is made equal to that in each of FIGS. 4A to 4D.

In the examples illustrated in FIGS. 5A and 5B, a limit is imposed on the increase speed of the regenerative braking force. That is, in FIGS. 5A and 5B, the increasing gradient of the regenerative braking force is controlled more gently than in the example illustrated in each of FIGS. 4A to 4C. Accordingly, as illustrated in FIG. 5A, the regenerative braking force target value is smaller than the required braking force from the initial stage of the braking request. In this point, the example in FIG. 5A is different from that in FIG. 4A in which the regenerative braking force target value is equal to the required braking force before the target value reaches an upper limit. The shortage of the required braking force, which is caused when the regenerative braking force is only used, is compensated by the fluid pressure braking force, as illustrated in FIG. 5B.

As illustrated in FIG. 5C, when the required braking force is covered by the fluid pressure braking force, the fluid pressure braking force rises at a time delayed by a time Δt in comparison with the regeneration cooperative control illustrated in FIGS. 5A and 5B, the delay being caused due to the response delay of the fluid pressure braking force. The delayed time is equal to that in the example illustrated in FIG. 4D. In FIG. 5C, however, the rise of the braking force occurring immediately after the braking request has been generated is suppressed by the limit of the gradient of the regenerative braking force. Accordingly, a difference in brake feeling, occurring between when the required braking force is covered by the fluid pressure braking force and when the regeneration cooperative control is executed, is reduced. Accordingly, a sense of discomfort that a driver may feel can also be reduced in comparison with the example illustrated in FIGS. 4A to 4D. However, when the regenerative braking force is limited, the ratio of the regenerative braking force to the total braking force is decreased. A decrease in the ratio of the regenerative braking force is not preferred in terms of improving fuel consumption.

Accordingly, in a first embodiment, the control unit adjusts the response property of the fluid pressure braking force occurring when the regenerative braking force is used, by taking the response property thereof with respect to the braking request occurring when the regenerative braking force is not used, as a reference. The control unit delays the rise timing of the fluid pressure braking force, occurring when the regenerative braking force is used, in comparison with that occurring when the regenerative braking force is not used. The control unit executes a delay amount switching control in which the delay amount of the fluid pressure braking force is switched depending on the presence/absence of the use of the regenerative braking force.

For example, when the regenerative braking force is used, the control unit controls the regenerative braking force and the friction braking force such that the total braking force rises at a time delayed by a first delay time from the braking request. The control unit temporarily provides a delay to the braking force at least in the initial stage of the occurrence of the braking request. The first delay time is set, for example, so as to match the rise timing of the braking force occurring when the regenerative braking force is used, to that occurring when the regenerative braking force is not used. Accordingly, a difference in brake feeling, occurring depending on the presence/absence of the regenerative braking force, can be reduced. Further, by generating the friction braking force at a delayed time, the ratio of the regenerative braking force, which rises at a preceding time to the total braking force, can be enhanced.

On the other hand, when the regenerative braking force is not used, the control unit controls the friction braking force such that the braking force rises at a time delayed from the braking request by a second delay time smaller than the first delay time. In this case, the first and second delay times are set so as to match, to each other, the rise timings of the braking force occurring when the regenerative braking force is used and when it is not used. Alternatively, when the regenerative braking force is not used, the control unit controls the friction braking force without providing a delay.

Figure 6A:
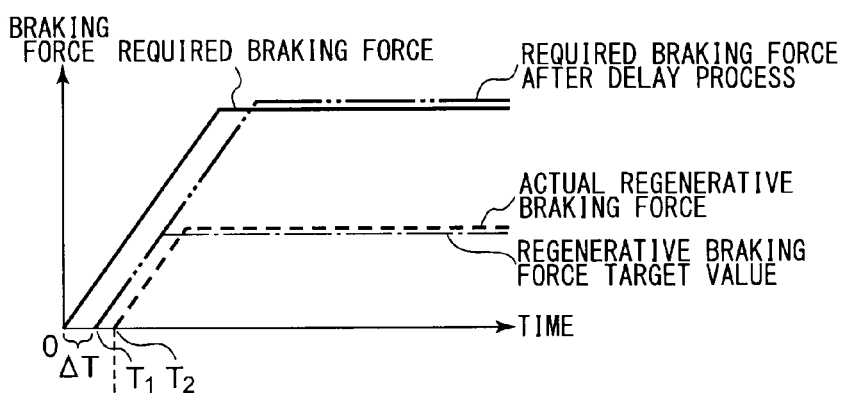
FIGS. 6A to 6C are graphs schematically illustrating the time change in a braking force according to a first embodiment.
Figure 6B:
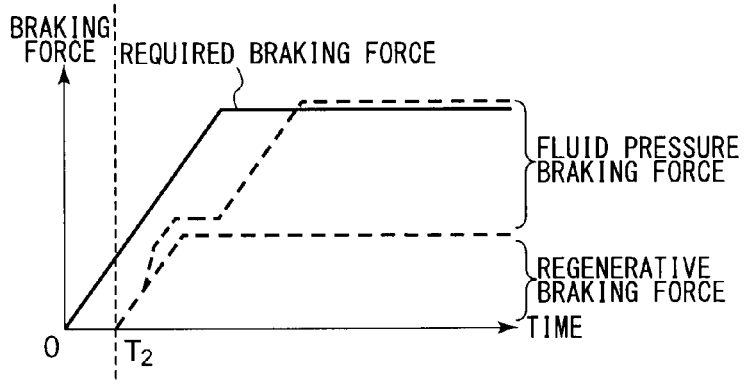
Figure 6C:
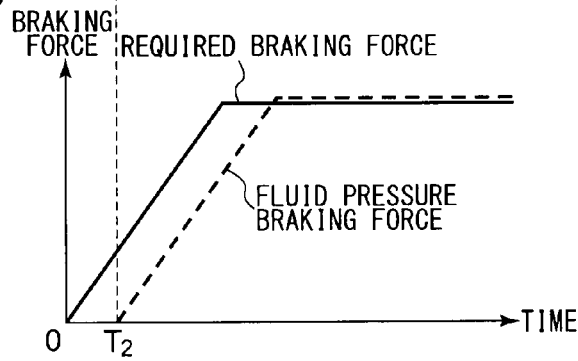

FIGS. 6A to 6C are graphs each schematically illustrating the time change in the braking force according to the first embodiment. FIGS. 6A and 6B illustrate an example of a brake regeneration cooperative control, while FIG. 6C illustrates a comparative example. The comparative example illustrated in FIG. 6C is the same as that illustrated in FIG. 4D. Similarly to FIGS. 4A to 4D, the vertical axis and horizontal axis in each of FIGS. 6A to 6C represent the braking force and time, respectively. The time change in the required braking force in each of FIGS. 6A to 6C is also made equal to that in each of FIGS. 4A to 4D.

The brake ECU 70 calculates the required braking force based on an operational input by a driver, and executes a process for delaying the required braking force by a delay time ΔT. The brake ECU 70 controls the regenerative braking force and the fluid pressure braking force based on the delayed required braking force. In FIG. 6A, the required braking force calculated based on the operational input is indicated by a solid line, while the required braking force subjected to the delay process is indicated by a dashed-two dotted line. It can be said that the required braking force indicated by the solid line, which is based on the operational input, is a so-called temporary required braking force in terms of not being used directly for a braking force control.

As illustrated in FIG. 6A, the required braking force subjected to the delay process rises at time $T_1$ that is delayed from the braking request by a delay time ΔT. The required braking force subjected to the delay process has the same waveform as that of the temporary required braking force, except that the delay time ΔT is added to the temporary required braking force based on the operational input. The brake ECU 70 matches the regenerative braking force target value to the required braking force subjected to the delay process, before the required braking force subjected to the delay process reaches the upper limit of the regenerative braking force target value. When the required braking force subjected to the delay process exceeds the upper limit of the regenerative braking force target value, the brake ECU 70 matches the regenerative braking force target value to the upper limit. Similarly to FIG. 4A, the actual regenerative braking force rises at time $T_2$ delayed from the target value, and is controlled so as to follow the target value.

FIG. 6B illustrates the change in the total braking force with respect to the required braking force. The change in the total braking force illustrated in FIG. 6B is the same as that illustrated in FIG. 4C, except that the total braking force in FIG. 6B is delayed from the braking request. The brake ECU 70 obtains a fluid pressure braking force target value by subtracting the actual regenerative braking force from the required braking force subjected to the delay process. The brake ECU 70 controls the fluid pressure braking force based on the fluid pressure braking force target value. As illustrated in FIG. 6B, the time $T_2$ when the regenerative braking force, which is increased ahead of the fluid pressure braking force, is generated becomes the rise timing of the total braking force.

Herein, the delay time $\Delta T$ is set such that the rise timing $T_2$ of the braking force (see FIG. 6B), occurring when the regenerative braking force is used, and the rise timing $T_2$ of the fluid pressure braking force (see FIG. 6C), occurring when the regenerative braking force is not used, are matched to each other. Accordingly, the rise timing of the braking force can be made common, irrespective of the use of the regenerative braking force. Therefore, a difference in brake feeling, occurring between when the regenerative braking force is used and when it is not used, can be reduced.

Alternatively, the rise timing of the braking force, occurring when the regenerative braking force is used, may be shifted from that occurring when the regenerative braking force is not used. Not only a rise timing but also an increase profile of the braking force can affect a brake feeling. In view of this, a delay time $\Delta T$ may be defined so as to reduce a difference in brake feeling, occurring between when the regenerative braking force is used and when it is not used.

Alternatively, the brake ECU 70 may delay the required braking force occurring when the regenerative braking force is used and adjust the delay of the fluid pressure braking force occurring when the regenerative braking force is not used. In this case, the brake unit ECU 70 may suppress the difference with a brake feeling occurring when the regenerative braking force is used by delaying the fluid pressure braking force occurring when the regenerative braking force is not used. On the contrary, the brake ECU 70 may suppress the difference with the brake feeling occurring when the regenerative braking force is used by enhancing the response property of the fluid pressure braking force occurring when the regenerative braking force is not used.

Thus, in the example illustrated in FIGS. 6A and 6B, the rise of the braking force occurring when the regenerative braking force is used is delayed as a whole with respect to the required braking force. In particular, by delaying the rise of the fluid pressure braking force, the distribution ratio of the regenerative braking force to the required braking force can be increased. Different from the case where the regenerative braking force is limited (see FIGS. 5A and 5B), the regenerative braking force can be controlled at a distribution profile at which the regenerative braking force is utilized at a maximum. Accordingly, the recovery amount of a regenerative energy can be increased. In addition, because the regenerative braking force and the fluid pressure braking force are uniformly delayed, the fact that the regenerative braking force rises precedingly to the fluid pressure braking force is not changed. Accordingly, the delay of the fluid pressure braking force can be compensated by the regenerative braking force, thereby allowing the delay of the rise of the total braking force to be suppressed to a minimum level.

The brake regeneration cooperative controls illustrated in FIGS. 4A to 6B may be properly selected and used in accordance with situations. For example, the brake ECU 70 may execute the delay adjustment control illustrated in FIGS. 6A and 6B for the normal braking, and may execute the high-response control illustrated in FIGS. 4A to 4C for the emergency braking. Alternatively, when the regenerative braking force limitation, which is illustrated in FIGS. 5A and 5B, is suitable for achieving a desired brake feeling, the brake ECU 70 may impose a limit on the maximum value of the regenerative braking force or the maximum value of the increase speed of the regenerative braking force.

Figure 7:
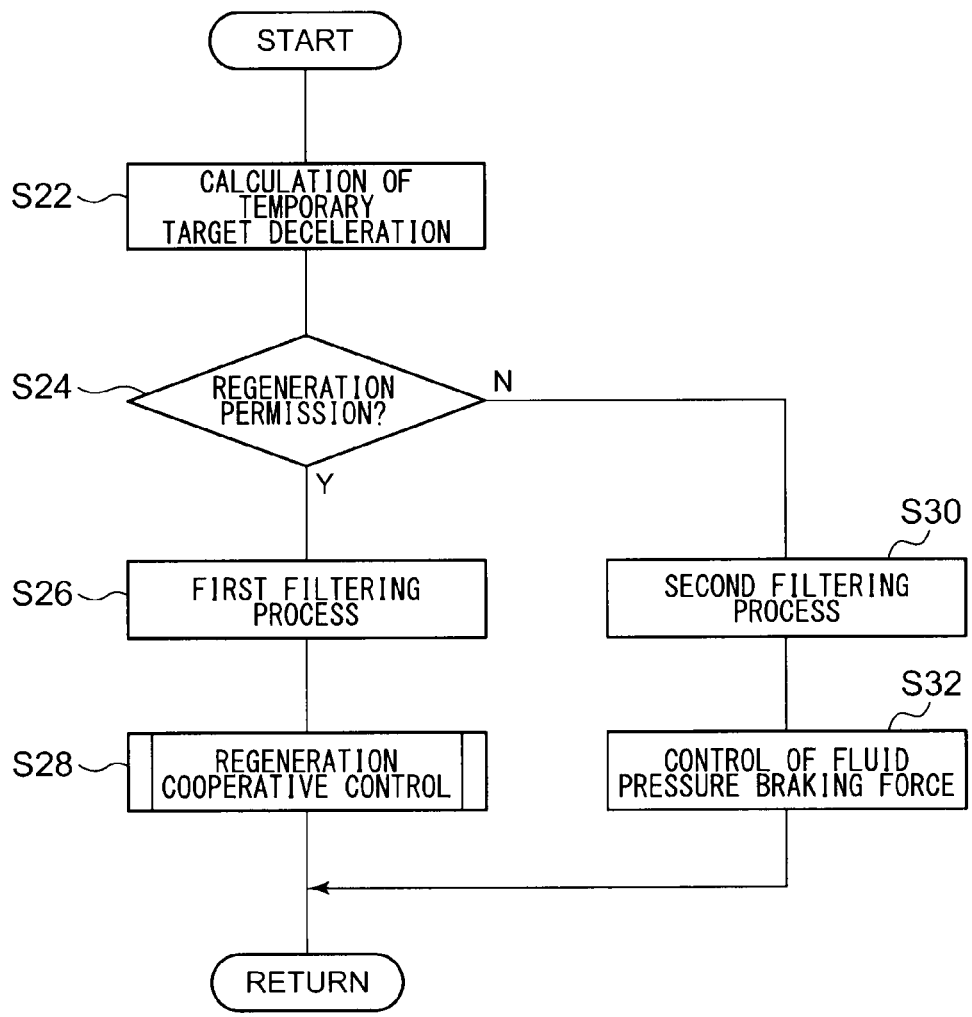
FIG. 7 is a flowchart for explaining an example of a brake regeneration cooperative control process according to the first embodiment.

FIG. 7 is a flowchart for explaining an example of a brake regeneration cooperative control process according to the first embodiment. The process illustrated in FIG. 7 is different from the regeneration cooperative control illustrated in FIG. 3, in that the fact that a delay amount, different from others depending on whether the regenerative braking force is permitted, is provided to the target deceleration is added.

The brake ECU 70 first calculates a temporary target deceleration (S22). Herein, the temporary target deceleration corresponds to the target deceleration in FIG. 3 (S10 in FIG. 3). That is, the brake ECU 70 calculates the temporary target deceleration based on, for example, measured values of a master cylinder pressure and a stroke.

Subsequently, the brake ECU 70 determines whether it is in a state where the use of the regenerative braking force is permitted (S24). The brake ECU 70 determines, for example, whether the brake control mode is a regeneration permission mode. The brake ECU 70 usually selects the regeneration permission mode on the premise that the brake control system operates normally. However, there is sometimes the case where the brake ECU 70 selects a regeneration prohibition mode to cover the required braking force by the fluid pressure braking force when the brake control system operates normally. For example, when the battery 12 is fully charged, the regenerative braking force cannot be taken out, and hence the regeneration prohibition mode is selected. Also, when a gear change is being executed, a vehicle deceleration varies relatively greatly, and hence the regeneration prohibition mode is selected. The regeneration prohibition mode is selected also while a vehicle is moving at low speed.

When the regeneration permission mode is selected (S24/Y), the brake ECU 70 executes a first filtering process on the temporary target deceleration (S26). The brake ECU 70 executes a regeneration cooperative control based on the target deceleration on which the first filtering process has been performed (S28). The regeneration cooperative control may be the regeneration priority mode described with reference to FIG. 3, or may be the aforementioned regeneration auxiliary mode or regeneration-combined mode.

On the other hand, when the regeneration permission mode is not selected (S24/N), the brake ECU 70 executes a second filtering process (S30). The brake ECU 70 controls the fluid pressure braking force based on the target deceleration on which the second filtering process has been performed (S32). That is, the brake ECU 70 calculates the target value of the fluid pressure braking force based on the target deceleration on which the second filtering process has been performed. The brake ECU 70 then controls the fluid pressure actuator 40 according to the target value to generate the fluid pressure braking force. As a result, for example, the fluid pressure braking force as illustrated in FIG. 4D is generated.

The second filtering process is one in which the temporary target deceleration is subjected to a second low-pass filter. The upper limit of the passing frequency band of the second low-pass filter is set, for example, taking into consideration that a noise that can be caused in the temporary target deceleration is sufficiently reduced. The first filtering process is one in which the temporary target deceleration is subjected to a first low-pass filter. The upper limit of the passing frequency band of the first low-pass filter is set to a value lower than that of the second low-pass filter. For example, the upper limit of the passing frequency of the first low-pass filter may be smaller than 10% of that of the second low-pass filter. Thus, by making the filtering processes performed on the target deceleration in the regeneration permission mode and the regeneration prohibition mode different from each other, desired delay adjustment can be performed. Alternatively, the brake ECU 70 may omit the second filtering process and may perform a desired delay process on the target deceleration in the regeneration permission mode.

In the aforementioned example, a filtering process is performed on the temporary target deceleration; however, the delay process is not limited thereto. The brake ECU 70 may execute a delay process on the upstream of a temporary target deceleration calculation process. For example, the brake ECU 70 may execute a delay process on a measured value that is a basis of the calculation of the temporary target deceleration (e.g., a master cylinder pressure, pedal stroke, pedal tread force, or the like). In this case, the brake ECU 70 first determines whether it is in a state where the use of the regenerative braking force is permitted, and switches a delay process to be executed on the measured value depending on the presence/absence of the permission. Alternatively, the brake ECU 70 may execute a delay process on the downstream of the temporary target deceleration calculation process. For example, the brake ECU 70 may execute a delay process on the target braking force for each wheel calculated based on the temporary target deceleration.

The delay process is not limited to a filtering process. The bake ECU 70 may execute, for example, a buffer process as a delay process, instead of a filtering process. The buffer process means a process in which, for example, the friction braking force is generated based on the target deceleration in the regeneration prohibition mode, while the total braking force is generated based on the target deceleration calculated before a predetermined period of time in the regeneration permission mode. Alternatively, the brake ECU 70 may execute a pseudo-delay process that simulates a delay. The brake ECU 70 may execute, for example, a gradient limitation process or a target value deflation process as the pseudo-delay process. The gradient limitation process means a process in which, for example, the increase speed of the braking force is limited in the regeneration permission mode in comparison with the regeneration prohibition mode. The brake ECU 70 may execute, as the delay process, a process in which multiple processes selected from the group of the filtering process, buffer process, and pseudo-delay process are combined.

In addition, a delay amount may be made variable with respect to time. Because there is the tendency that the sensitivity of a driver to a variation in a deceleration becomes dull when a certain period of time has elapsed from the stepping-on of the brake pedal, in comparison with the initial stage thereof, a braking response property may be enhanced by making a delay small when a certain period of time has elapsed from the occurrence of the braking force, in comparison with the initial stage thereof. For example, the brake ECU 70 may change the upper limit of the passing frequency band of the first filter in accordance with a value or time rate of change of the target deceleration. The brake ECU 70 may make the upper limit of the passing frequency band of the first filter larger when the stepping-on speed of the brake pedal 24 is relatively high, than when the stepping-on speed thereof is low. Alternatively, the brake ECU 70 may make the upper limit of the passing frequency band of the first filter larger as time elapses from the braking request.

Because the response properties of the fluid pressure braking force vary depending on vehicles, the brake ECU 70 may measure the response property of the fluid pressure braking force and may execute a learning process for adjusting a delay process based on a measurement result.

Figure 8:
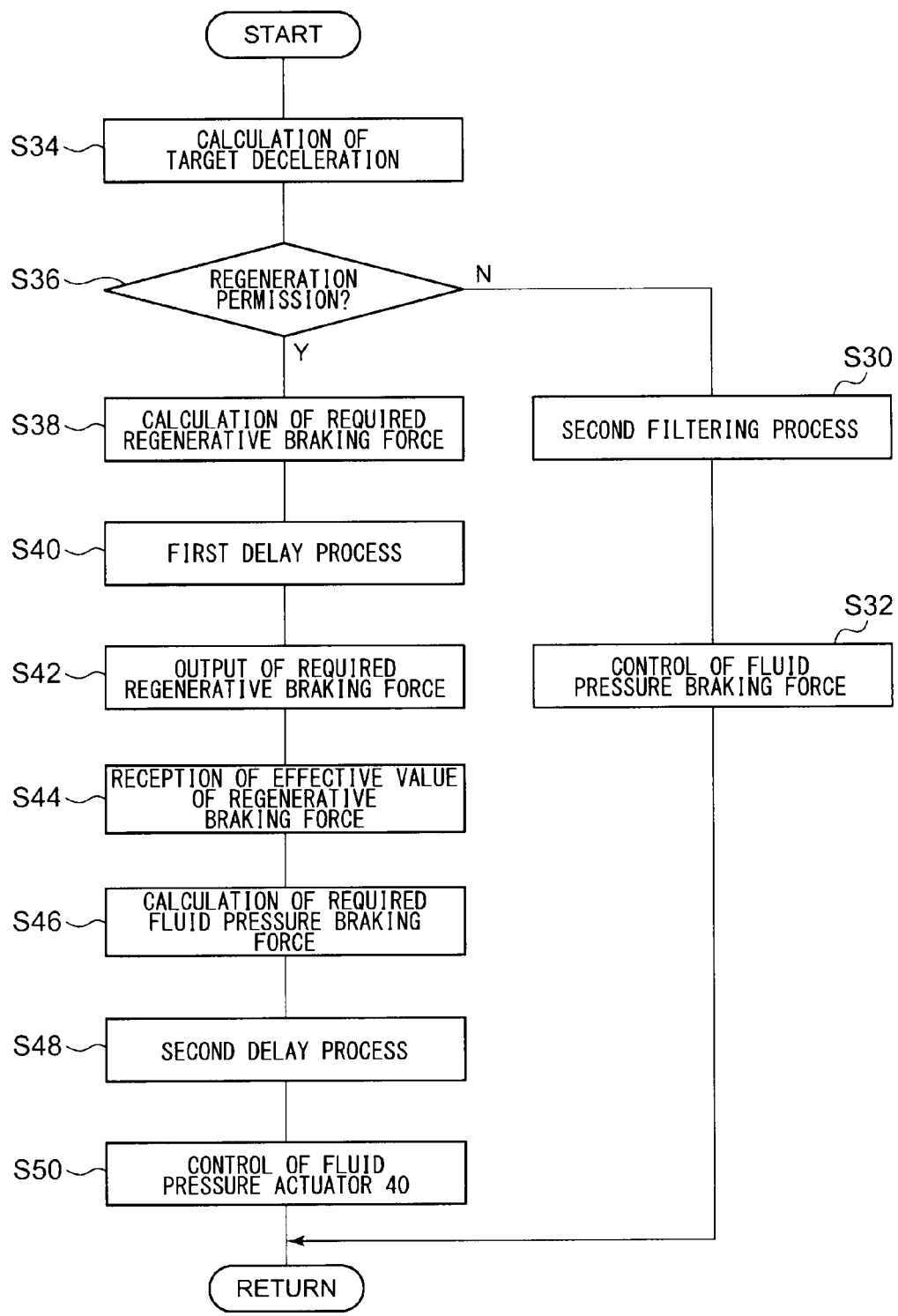
FIG. 8 is a flowchart for explaining another example of the brake regeneration cooperative control process according to the first embodiment.

FIG. 8 is a flowchart for explaining another example of the brake regeneration cooperative control process according to the first embodiment. In the example described with reference to FIG. 7, the delay process is comprehensively executed on the temporary target deceleration; however, the example illustrated in FIG. 8 is different in that the delay process is executed individually on the regenerative braking force and the fluid pressure braking force. However, also in the example illustrated in FIG. 8, a delay is provided to each of the regenerative braking force and the fluid pressure braking force, similarly to the example in FIG. 7. In the example illustrated in FIG. 7, the delay process is added on the upstream of the regeneration cooperative control process illustrated in FIG. 3, on the other hand, in the example illustrated in FIG. 8, the delay process is incorporated in the process illustrated in FIG. 3.

When receiving a braking request, the brake ECU 70 calculates a target deceleration, i.e., the required braking force (S34). Subsequently, the brake ECU 70 determines whether it is in a state where the use of the regenerative braking force is permitted (S36). When the use of the regenerative braking force is permitted (S36/Y), the brake ECU 70 calculates a required regenerative braking force based on the target deceleration (S38). The brake ECU 70 executes a first delay process on the required regenerative braking force (S40). The brake ECU 70 transmits the delayed required regenerative braking force to the hybrid ECU 7 (S42).

The brake ECU 70 receives a regenerative braking force effective value from the hybrid ECU 7 (S44). The brake ECU 70 calculates a required fluid pressure braking force by subtracting the regenerative braking force effective value from the target deceleration (S46). The brake ECU 70 executes a second delay process on the required fluid pressure braking force (S48). The brake ECU 70 calculates a target fluid pressure for each of the wheel cylinders 23FR to 23RL based on the required fluid pressure braking force, and it controls the fluid pressure actuator 40 such that a wheel cylinder pressure is equal to the target fluid pressure (S50).

On the other hand, when the use of the regenerative braking force is not permitted (S36/N), the brake ECU 70 executes a second filtering process, similarly to the example illustrated in FIG. 7 (S30). The brake ECU 70 controls the fluid pressure braking force based on the target deceleration on which the second filtering process has been executed (S32).

Herein, the first delay process and the second delay process may be the same as each other, and they are, for example, the first filtering process (S26 in FIG. 7). Alternatively, by making the first delay process and the second delay process different from each other, the response property of the regenerative braking force and that of the fluid pressure braking force may be adjusted individually. Thereby, the adjustment of the brake feeling can be performed more finely. It is desirable in terms of enhancing the ratio of the regenerative braking force to the required braking force to make a delay amount by the second delay process larger than that by the first delay process.

Alternatively, the first delay process may be executed on the received required regenerative braking force in the hybrid ECU 7, not in the brake ECU 70. Also, the second delay process may be executed at any appropriate point on the downstream of the calculation of the required fluid pressure braking force (S46). For example, the brake ECU 70 may execute the second delay process on the fluid pressure braking force target value for each wheel, or may execute on the target fluid pressure for each wheel cylinder 23.

Further, the brake ECU 70 may execute a third delay process on a third controlled variable in addition to the regenerative braking force and the friction braking force. The third controlled variable is, for example, engine brake. It is desirable in terms of suppressing the wear of a friction member to use engine brake rather than the friction braking force. When improvement in fuel consumption is considered to be most important, the priority of the three controlled variables becomes the order of the regenerative braking force, engine brake, and the friction braking force. The response properties of the three controlled variables are generally different from this priority order, and becomes the order of the regenerative braking force, the friction braking force, and engine brake. Alternatively, electric steering in a so-called VSC control for stabilizing the behaviors of a vehicle may be adopted as a third controlled variable instead of engine brake.

In this case, when the use of the regenerative braking force is permitted, the brake ECU 70 executes the first delay process, second delay process, and third delay process on the regenerative braking force, the friction braking force, and engine brake, respectively. The first through third delay processes may be the same as each other. Alternatively, the delay by the third delay process may be smaller than that by the second delay process to use more engine brake having a relatively high priority. On the other hand, when the use of the regenerative braking force is not permitted, the brake ECU 70 reduces the delay of each of the friction braking force and engine brake in comparison with the case where the use of the regenerative braking force is permitted. At the time, the brake ECU 70 may adjust the delay by each of the friction braking force and engine brake such that the response property of engine brake is higher than that of the friction braking force.

Figure 9:
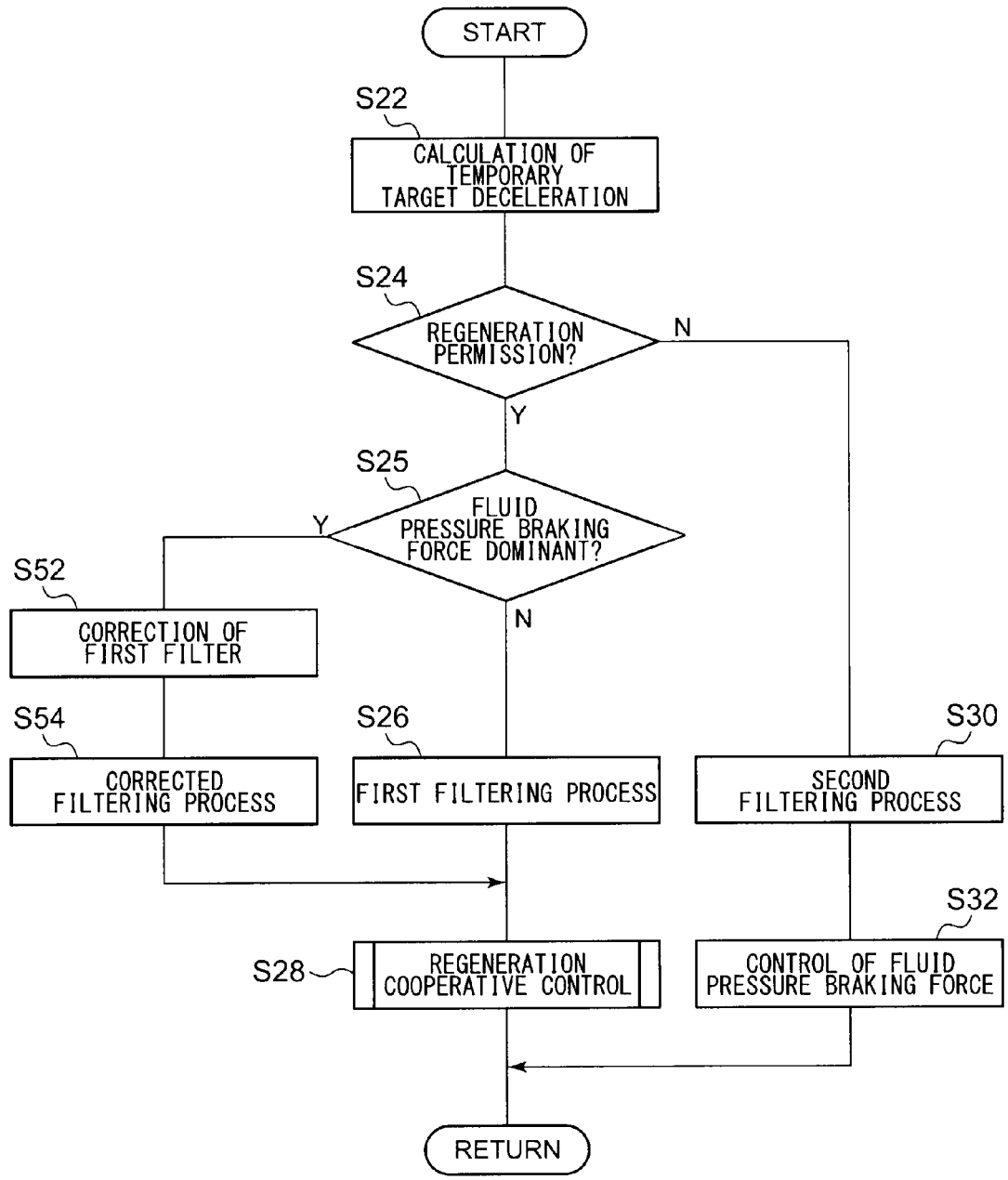
FIG. 9 is a flowchart for explaining still another example the brake regeneration cooperative control process according to the first embodiment.

FIG. 9 is a flowchart for explaining still another example of the brake regeneration cooperative control process according to the first embodiment. The example illustrated in FIG. 9 is different from that illustrated in FIG. 7 in that, when the fluid pressure braking force is dominant, the delay process is corrected. This correction of the delay process can also be applied to the example illustrated in FIG. 8 in a similar way. The case where the fluid pressure braking force is dominant means, for example, the case where the charging state of the battery 12 is close to full charge, and accordingly the room for outputting the regenerative braking force is small. In such a case, the response delay of the whole braking force can be reduced by making the delay small.

The brake ECU 70 first calculates a temporary target deceleration (S22), and determines whether it is in a state where the use of the regenerative braking force is permitted (S24). When the use thereof is not permitted (S24/N), the brake ECU 70 executes the second filtering process (S30). The brake ECU 70 controls the fluid pressure braking force based on the target deceleration on which the second filtering process has been executed (S32).

When the use of the regenerative braking force is permitted (S24/Y), the brake ECU 70 determines whether it is in a situation where the fluid pressure braking force is dominant (S25). When it is determined that the fluid pressure braking force is not dominant (S25/N), the brake ECU 70 executes the first filtering process on the temporary target deceleration (S26). The brake ECU 70 executes the regeneration cooperative control based on the target deceleration on which the first filtering process has been executed (S28).

On the other hand, when the fluid pressure braking force is dominant (S25/Y), the brake ECU 70 corrects the first filter (S52). The brake ECU 70 delays the temporary target deceleration by the corrected filter (S54). The brake ECU 70 executes the regeneration cooperative control based on the target deceleration on which the corrected filtering process has been executed (S28).

It is determined based on, for example, an amount of room for regeneration obtained by subtracting the required regenerative braking force from a regeneration-executable amount whether it is in a situation where the fluid pressure braking force is dominant. The brake ECU 70 determines that the fluid pressure braking force is dominant when the amount of room for regeneration is smaller than a predetermined threshold value. On the other hand, the brake ECU 70 determines that the fluid pressure braking force is not dominant when the amount of room for regeneration is larger than or equal to the threshold value. There is the tendency that, when the required regenerative braking force approaches the regeneration-executable amount, which is the upper limit of the regenerative braking force, the increase speed of the regenerative braking force effective value becomes relatively small. That is, the response property is decreased. Accordingly, it is desirable to reduce a delay when the amount of room for regeneration becomes small. Alternatively, the brake ECU 70 may determine whether it is in a situation where the fluid pressure braking force is dominant based on the regeneration-executable amount or an SOC (State Of Charge) instead of the amount of room for regeneration.

Accordingly, the brake ECU 70 corrects the upper limit of the passing frequency band of the first filter in accordance with the amount of room for regeneration. The brake ECU 70 corrects the upper limit of the passing frequency band more greatly as the amount of room for regeneration is smaller, by using, for example, a map stored in advance. Alternatively, the brake ECU 70 may correct the upper limit of the passing frequency band of the first filter based on the amount of room for regeneration or an SOC. When the corrected amount of the upper limit of the passing frequency band exceeds a limit value for avoiding a rapid change, the first filter may be corrected gradually so as not to exceed the limit value.

Alternatively, the brake ECU 70 may determine whether it is in a situation where the fluid pressure braking force is dominant based on vehicle speed. While a vehicle is moving at high speed, the regenerative braking force becomes relatively small. Accordingly, the brake ECU 70 may determine that the fluid pressure braking force is dominant while a vehicle is moving at speed larger than predetermined vehicle speed, and determine that the fluid pressure braking force is not dominant while a vehicle is moving at speed smaller than or equal to the predetermined vehicle speed. In this case, the brake ECU 70 may correct the delay process in accordance with vehicle speed.

Figure 10:
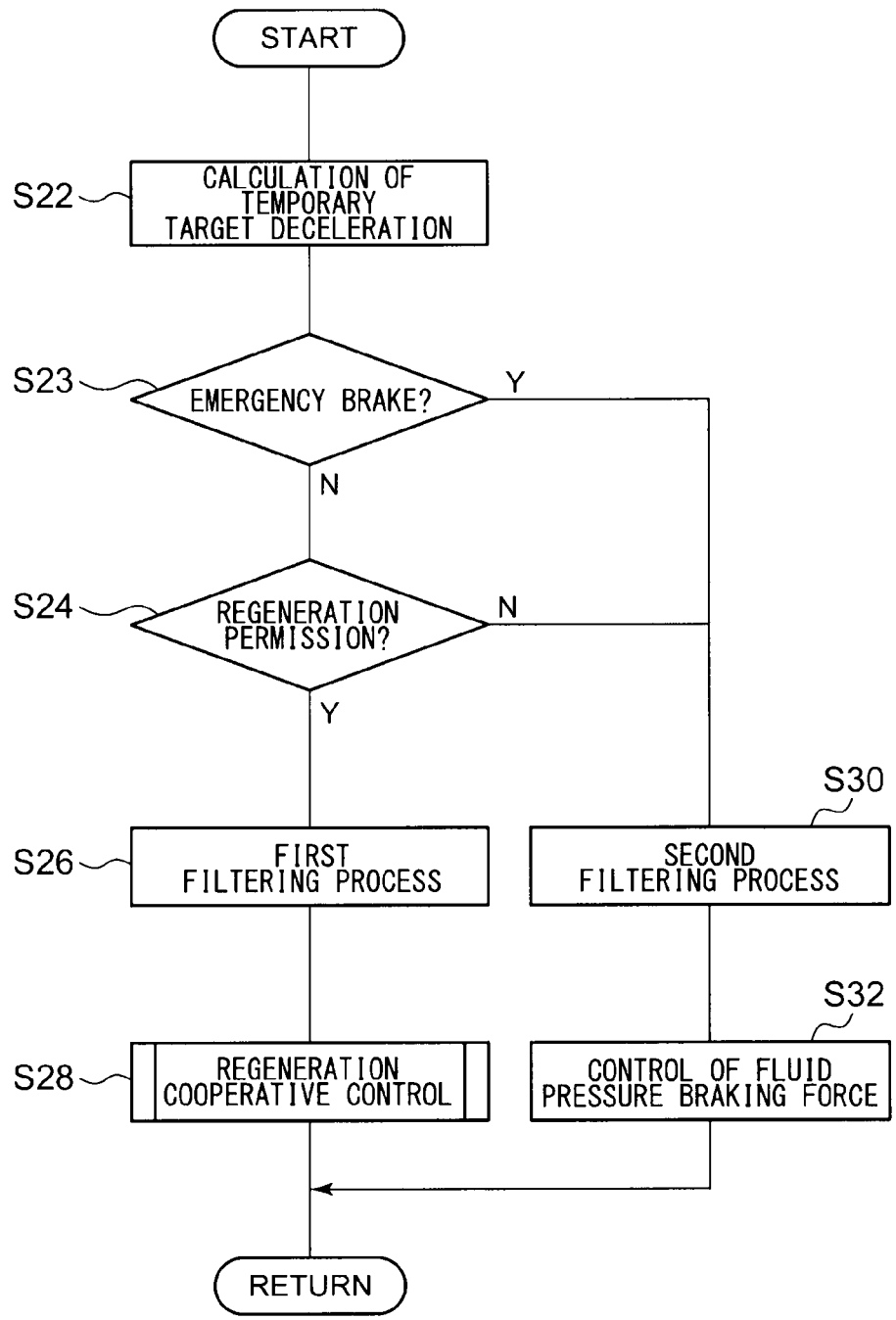
FIG. 10 is a flowchart for explaining still another example of the brake regeneration cooperative control process according to the first embodiment.

FIG. 10 is a flowchart for explaining still another example of the brake regeneration cooperative control process according to the first embodiment. The example illustrated in FIG. 10 is different from that illustrated in FIG. 7 in that, it is determined whether it is emergency brake, and when it is emergency brake, the delay is reduced. This determination of emergency brake can be applied similarly to the examples illustrated in FIGS. 8 and 9. Thereby, the braking force can be swiftly risen by reducing the delay in the case of emergency brake.

The brake ECU 70 first calculates a temporary target deceleration (S22), and determines whether it is emergency brake (S23). It is determined based on, for example, the increase speed of the temporary target deceleration or the increase speed of a measured value, which is the basis of the calculation of the temporary target deceleration, whether it is emergency brake. When the increase speed of the temporary target deceleration is larger than a predetermined value indicating emergency brake, the brake ECU 70 determines that it is emergency brake; on the contrary, when the increase speed thereof is smaller than the predetermined value, the brake ECU 70 determines that it is normal brake.

When it is determined that it is not emergency brake (S23/N), the brake ECU 70 determines whether the use of the regenerative braking force is permitted (S24). When the use thereof is permitted (S24/Y), the brake ECU 70 executes the first filtering process on the temporary target deceleration (S26). The brake ECU 70 executes the regeneration cooperative control based on the target deceleration on which the first filtering process has been executed (S28).

When the use of the regenerative braking force is not permitted (S24/N), the brake ECU 70 executes the second filtering process (S30). The brake ECU 70 controls the fluid pressure braking force based on the target deceleration on which the second filtering process has been executed (S32). Also, when it is emergency brake (S23/Y), the brake ECU 70 executes the second filtering process (S30) to generate the required braking force by the fluid pressure braking force (S32).

When it is emergency brake (S23/Y) and when the use of the regenerative braking force is permitted, the brake ECU 70 may execute the regeneration cooperative control. In this case, the brake ECU 70 may execute the regeneration cooperative control, without providing a delay to the target deceleration, as in the example illustrated in FIG. 4.

Subsequently, a second embodiment will be described. The brake ECU 70 enhances the response property of the regenerative braking force under a condition where it is relatively difficult for a driver to sense a change in the braking force. This means, in short, that the regenerative braking force is increased when a driver is insensible. Thereby, the regenerative braking force can be swiftly increased while a sense of discomfort, which a driver can feel, is being suppressed.

The brake ECU 70 adjusts the upper limit of the increase speed of the required regenerative braking force based on a physical amount by which the sensitivity of a driver to a variation in a vehicle deceleration is affected. When the physical amount is included in an insensitive range where the sensitivity of a driver is relatively low, the brake ECU 70 makes the upper limit of the increase speed of the required regenerative braking force larger than that occurring when the physical amount is in a sensitive range where the sensitivity of a driver is relatively high. Thereby, it can be permitted that the regenerative braking force is increased greatly when the sensitivity of a driver is low. It also becomes possible to flexibly increase the regenerative braking force in comparison with the case where the upper limit of the increase speed is defined to be a fixed constant value. On the other hand, when the sensitivity of a driver is high, an increase in the regenerative braking force is limited, thereby allowing a sense of discomfort occurring due to a sudden change in deceleration to be suppressed.

An example of the physical amount by which the sensitivity of a driver to a variation in the vehicle deceleration is affected includes, for example, a time rate of change of a target deceleration, vehicle speed, or an elapsed time from the braking start. The brake ECU 70 stores in advance a map in which the relationship between these physical amounts and the upper limit of the increase speed of a required regenerative braking force is indicated. The brake ECU 70 calculates the upper limit of the increase speed of a required regenerative braking force based on the measured physical amount. The brake ECU 70 calculates a required regenerative braking force under a limit on the upper limit of the increase speed. The second embodiment can be applied to the calculation of the required regenerative braking force in the aforementioned first embodiment, and can also be applied to the calculation of a required regenerative braking force in a regeneration braking force control different from that in the first embodiment.

Figure 11:
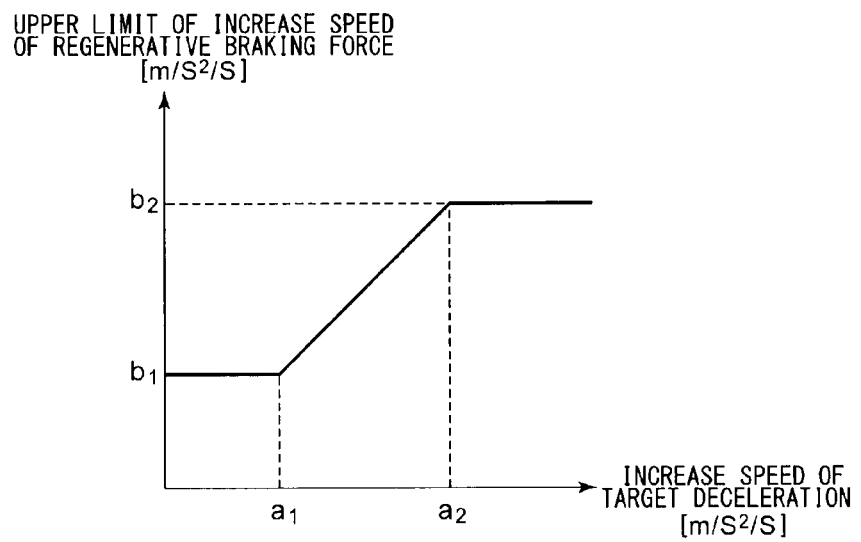
FIG. 11 is a graph illustrating an example of the relationship between the time rate of change of a target deceleration and the upper limit of the increase speed of a required regenerative braking force according to a second embodiment.

FIG. 11 is a graph illustrating an example of the relationship between the time rate of change of a target deceleration and the upper limit of the increase speed of a required regenerative braking force according to the second embodiment. The horizon axis in FIG. 11 represents the increase speed of a target deceleration, i.e., the increasing gradient of the required braking force by a driver. The vertical axis in FIG. 11 represents the upper limit of the increase speed of the regenerative braking force. As illustrated in FIG. 11, the brake ECU 70 makes the upper limit of the increase speed of a required regenerative braking force larger as the increase speed of a target deceleration is larger. Specifically, when the increase speed of a target deceleration is $a_1$, the brake ECU 70 sets the upper limit of the increase speed of a required regenerative braking force to $b_1$, and when the increase speed thereof is $a_2$, the brake ECU 70 sets the upper limit thereof to $b_2$. As the increase speed thereof is increased from $a_1$ to $a_2$, the upper limit thereof is linearly increased from $b_1$ to $b_2$. In addition, in the example illustrated in FIG. 11, a limit is imposed such that the upper limit thereof varies within a range of $b_1$ to $b_2$. Accordingly, when the increase speed thereof is smaller than $a_1$, the upper limit thereof is uniformly made to be $b_1$, and when the increase speed thereof is larger than $a_2$, the upper limit thereof is uniformly made to be $b_2$.

Thus, the brake ECU 70 permits large increase speed of the regenerative braking force when the increase speed of a target deceleration is relatively large, in comparison with when the increase speed thereof is relatively small. When a driver operates the brake pedal 24 rapidly, the regenerative braking force can be increased greatly.

Apart from this, there is sometimes the case where the generation of the regenerative braking force is initiated when the control modes returns to a regeneration permission mode from a regeneration prohibition mode during braking. In particular, when the control mode returns to the regeneration permission mode while a driver is holding the brake pedal 24, a vehicle deceleration suddenly varies due to a rise of the regenerative braking force, although a brake operation has not been changed. According to the second embodiment, the increase speed of the regenerative braking force is limited when the increase speed of a target deceleration is small, and hence a sense of discomfort occurring due to a sudden change in a vehicle deceleration can also be suppressed.

In the example illustrated in FIG. 11, a limit is defined such that the increase speed of the regenerative braking force is linearly increased with respect to the increase speed of a target deceleration; however, without being limited thereto, the increase speed of the regenerative braking force may be increased non-linearly. For example, when the increase speed of a target deceleration is smaller than a predetermined threshold value, the upper limit of the increase speed of the regenerative braking force may be set to a first value, and when the increase speed thereof is larger than or equal to the predetermined threshold value, the upper limit thereof may be set to a second value larger than the first value. The upper limit may be set to multiple values, not only to two values as stated above. For example, multiple divisions may be set in accordance with the magnitude of the increase speed of a target deceleration such that an upper limit thereof is set for each of the multiple divisions.

Figure 12:
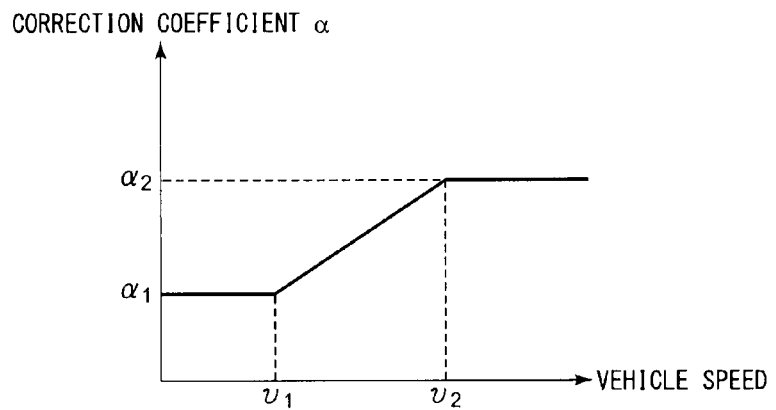
FIG. 12 is a graph illustrating an example of the relationship between vehicle speed and a correction coefficient $\alpha$ according to the second embodiment.

FIG. 12 is a graph illustrating an example of the relationship between vehicle speed and a correction coefficient α according to the second embodiment. In an example, the brake ECU 70 corrects, with the correction coefficient α, the upper limit of the increase speed of a required regenerative braking force in accordance with vehicle speed. The brake ECU 70 corrects the upper limit of the increase speed of the regenerative braking force so as to be large when a vehicle is moving at high speed, in comparison with when the vehicle is moving at low speed. The brake ECU 70 uses, as an upper limit, a value obtained by multiplying the upper limit of the increase speed of a required regenerative braking force, which is obtained from, for example, the map illustrated in FIG. 11, by the correction coefficient α. Even when the upper limit thereof is corrected in this way, the improvement in fuel consumption by the regenerative braking force and suppression of a variation in brake feeling can be both satisfied. In particular, when a vehicle is moving at high speed, the recovery energy by regeneration becomes large, and hence the contribution to the improvement in fuel consumption becomes large. As a vehicle is moving at higher speed, it becomes difficult to sense a variation in brake feeling, and hence an adverse influence on the feeling also becomes small.

The horizontal axis in FIG. 12 represents vehicle speed, while the vertical axis represents the correction coefficient α. As illustrated in FIG. 12, the brake ECU 70 makes the correction coefficient α larger as the vehicle speed is larger. Specifically, when the vehicle speed is $v_1$, the correction coefficient α is set to $α_1$, and when the vehicle speed is $v_2$, the correction coefficient α is set to $α_2$. As the vehicle speed is increased from $v_1$ to $v_2$, the correction coefficient α is linearly increased from $α_1$ to $α_2$. Because the correction coefficient α can be varied within a range of $α_1$ to $α_2$ in FIG. 12, the correction coefficient α is uniformly set to $α_1$ when the vehicle speed is smaller than $v_1$, and the correction coefficient α is uniformly set to $α_2$ when the vehicle speed is larger than $v_2$. At least the upper limit of the increase speed of a required regenerative braking force, obtained from the map illustrated in FIG. 11, may be maintained by assuming that the minimum value of the correction coefficient α (which is the correction coefficient $α_1$ in FIG. 12) is 1.

Figure 13:
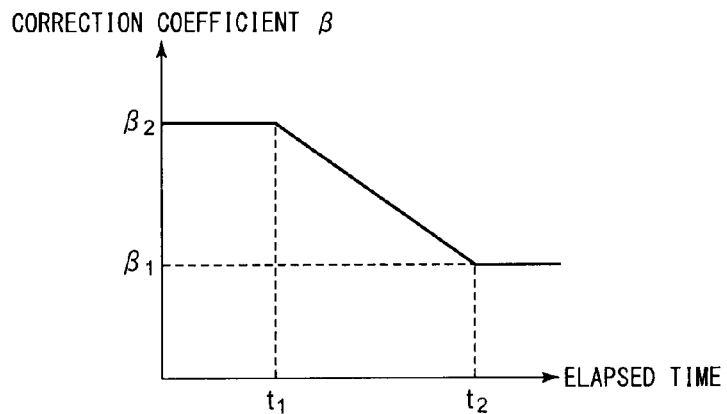
FIG. 13 is a graph illustrating an example of the relationship between an elapsed time and a correction coefficient $\beta$ according to the second embodiment.

FIG. 13 is a graph illustrating an example of the relationship between an elapsed time and a correction coefficient β according to the second embodiment. In an example, the brake ECU 70 corrects, with the correction coefficient β, the upper limit of the increase speed of a required regenerative braking force in accordance with an elapsed time from a braking request. The brake ECU 70 corrects the upper limit of the increase speed of the regenerative braking force so as to be small as time elapses. It is because there is the tendency that it is difficult for a driver to sense an excessive effect of braking in the initial stage of stepping-on of the brake pedal. The brake ECU 70 uses, as an upper limit, a value obtained by multiplying the upper limit of the increase speed of a required regenerative braking force, which is obtained from, for example, the map illustrated in FIG. 11, by the correction coefficient β. The brake ECU 70 may use both the correction coefficient α and the correction coefficient β in combination. In this case, the brake ECU 70 uses, as an upper limit, a value obtained by multiplying the upper limit thereof, which is obtained from, for example, the map illustrated in FIG. 11, by the correction coefficient α and further by the correction coefficient β.

The horizontal axis in FIG. 13 represents an elapsed time from a braking request, while the vertical axis represents a correction coefficient β. As illustrated in FIG. 1, the brake ECU 70 makes the correction coefficient β smaller as time elapses. Specifically, the correction coefficient β is made to be $β_1$ from a braking request to time $t_1$, and the correction coefficient β is linearly increased from $β_1$ to $β_2$ between time $t_1$ and time $t_2$. After time $t_2$, the correction coefficient β is made to be $β_2$. The upper limit of the increase speed of a required regenerative braking force, obtained from the map illustrated in FIG. 11, may be made to be an upper limit by setting the maximum value of the correction coefficient β (which is the correction coefficient $β_1$ in FIG. 13) to 1.

A third embodiment will be described. In the aforementioned first and second embodiments, it is premised that a regeneration start condition is satisfied at the request of braking. That is, it is permitted that the brake ECU 70 generates the regenerative braking force immediately after the request of braking. However, it is supposed that a regeneration start condition is not satisfied and that is satisfied during braking. For example, there is sometimes the case where the resumption of regeneration is permitted when a battery is consumed after the braking start, or the case where regenerative braking is prohibited before the completion of a gear change operation and a braking request is generated during the gear change operation. Also, it is supposed that the speed of a vehicle is gradually increased during the braking while the vehicle is moving on a downhill to reach a vehicle threshold value at which regenerative braking is permitted.

In these cases, regenerative braking is temporarily stopped in the initial stage of the braking and the regenerative braking force rises at a delayed time with a regeneration start condition being satisfied. That is, the timing at which the regenerative braking force rises is delayed from the braking start. It can be considered that, because the regenerative braking force has an excellent response property, the regenerative braking force is increased rapidly with the satisfaction of a regeneration start condition. Although this is advantageous in terms of recovering a regenerative energy, it is not necessarily advantageous from the viewpoint of a brake feeling. A reduction in the fluid pressure braking force is delayed from an increase in the regenerative braking force. Accordingly, when a regeneration start condition is satisfied, in particular, while a driver is holding an operation amount of the brake pedal to be constant, there is the fear that a vehicle deceleration may be increased greatly in a transitional manner by the appearance of the regenerative braking force. There is the possibility that a sense of discomfort may be provided to a driver by such a sudden change in the deceleration.

In view of this, improvement in brake feeling is taken as being important in the third embodiment. The brake ECU 70 limits the increase speed of the regenerative braking force when the prohibition of regenerative braking is cancelled during braking. The brake ECU 70 temporarily limits the increase speed of the regenerative braking force at least immediately after the cancellation of the prohibition. The brake ECU 70 strengthens the limit imposed on the increase speed of the regenerative braking force when the prohibition of regenerative braking is cancelled during braking, in comparison with the limit imposed on that when regenerative braking is permitted at a braking request. The third embodiment may be applied to the aforementioned first and second embodiments or may be applied to a regenerative braking force control different from the first and second embodiments.

Figure 14:
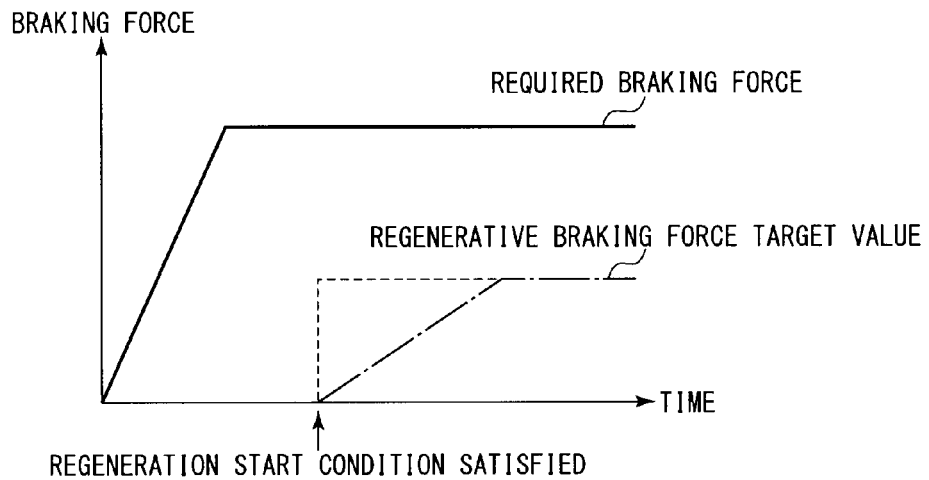
FIG. 14 is a graph illustrating an example of the time change in a regenerative braking force according to a third embodiment.

FIG. 14 is a view illustrating an example of the time change in a regenerative braking force according to the third embodiment. The vertical axis in FIG. 14 represents the braking force, while the horizontal axis represents an elapsed time from a braking request. The targets of the required braking force and the regenerative braking force are illustrated in FIG. 14. The regenerative braking force target value limited by the present embodiment is indicated by a dashed-dotted line, while the regenerative braking force target value that is not limited is indicated by a dashed line.

FIG. 14 illustrates the case where regenerative braking is prohibited in the initial stage of the braking start and a regeneration start condition is satisfied after the required braking force has reached a constant value. As indicated by the dashed line, a regenerative target value in accordance with the required braking force is set with the satisfaction of the regeneration start condition when the increase speed of the regenerative braking force is not limited. Because an actual regenerative braking force is controlled according to the target value, the regenerative braking force rises rapidly. On the other hand, by limiting the increase speed of the regenerative braking force, as indicated by the solid line, the rise of the regenerative braking force can be made gentle.

Figure 15:
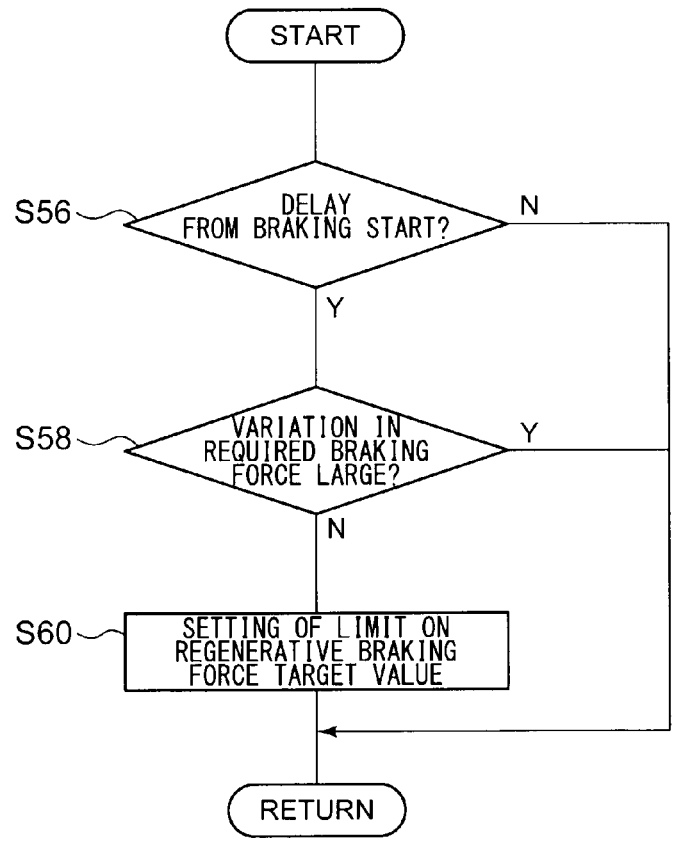
FIG. 15 a flowchart for explaining an example of a control process according to the third embodiment.

FIG. 15 is flowchart for explaining an example of a control process according to the third embodiment. When a regeneration start condition is satisfied in the regeneration prohibition mode, the brake ECU 70 repeatedly executes the following process for at least a predetermined period of time. The regeneration start condition includes, for example, those in which: vehicle speed is larger than or equal to one at which regeneration is permitted; the SOC in the battery 12 is smaller than a predetermined value at which regeneration is permitted; and a gear change operation is not being performed in a vehicle, etc.

The brake ECU 70 determines whether the elapsed time from the braking start to the satisfaction of a regeneration start condition exceeds a predetermined delay time (S56). It is because, when the braking start and the satisfaction of a regeneration start condition occur at a timing that can be considered to be the same time, it is not needed to set the limit according to the present embodiment. Accordingly, it is sufficient to set the predetermined delay time to an approximate time by which the braking start and the rise timing of the regenerative braking force cannot be considered to be the same as each other. The predetermined delay time is set to be, for example, smaller than or equal to several hundreds msec.

When it is determined that there is a delay from the braking start (S56/Y), the brake ECU 70 determines whether a variation in the required braking force is large (S58). Specifically, the brake ECU 70 determines whether the time rate of change of a target deceleration is smaller than a threshold value. It is because a sense of discomfort, occurring due to a rapid increase in the regenerative braking force, is conspicuous when a variation in the regenerative braking force is small. Alternatively, this determination may be omitted and a limit may be set on the regenerative braking force target value when it is determined that there is a delay from the braking start.

When it is determined that a variation in the required braking force is small (S58/N), the brake ECU 70 sets a limit on the regenerative braking force target value (S60). For example, the brake ECU 70 sets an upper limit of increase speed smaller than the upper limit of the increase speed of the regenerative braking force set when regenerative braking is permitted at a request of braking. The brake ECU 70 calculates the regenerative braking force target value by using the preset limit. On the other hand, when it is determined that there is no delay from the braking start (S56/N) and when a variation in the required braking force is large (S58/Y), the brake ECU 70 ends the process without setting a limit on the regenerative braking force target value.

In FIG. 14, the increase speed of the regenerative braking force has a constant gradient; however, the increase speed is not limited thereto. The brake ECU 70 may vary the upper limit of the increase speed of the regenerative braking force. Similarly to, for example, the second embodiment, the brake ECU 70 may adjust the upper limit of the increase speed of a required regenerative braking force based on a physical amount by which the sensitivity of a driver to a variation in a vehicle deceleration is affected. Alternatively, the brake ECU 70 may reduce the limit as time elapses after the satisfaction of a regeneration start condition. According to the third embodiment, a sudden increase in the regenerative braking force, occurring during the transition to the regeneration permission mode, can be suppressed and a sense of discomfort that may be provided to a driver can be reduced. Alternatively, the brake ECU 70 may suppress an increase in the regenerative braking force by the aforementioned delay process, such as a filtering process, a buffer process, or the like, instead of the aforementioned gradient limitation process.

A fourth embodiment will be described. In the first embodiment, a delay is provided to the friction braking force, the delay being larger in the regeneration permission mode than that in the regeneration prohibition mode. Instead of this, the brake ECU 70 may permit increase speed to the friction braking force, the increase speed being larger in the regeneration prohibition mode than that in the regeneration permission mode. Thereby, a response delay of the friction braking force can also be reduced in the regeneration prohibition mode, in comparison with the regeneration permission mode. In addition to this, the brake ECU 70 may not provide a delay to the regenerative braking force in the regeneration permission mode. For example, the brake ECU 70 may use, in the regeneration permission mode, the braking force profile illustrated in FIG. 4.

Figure 16:
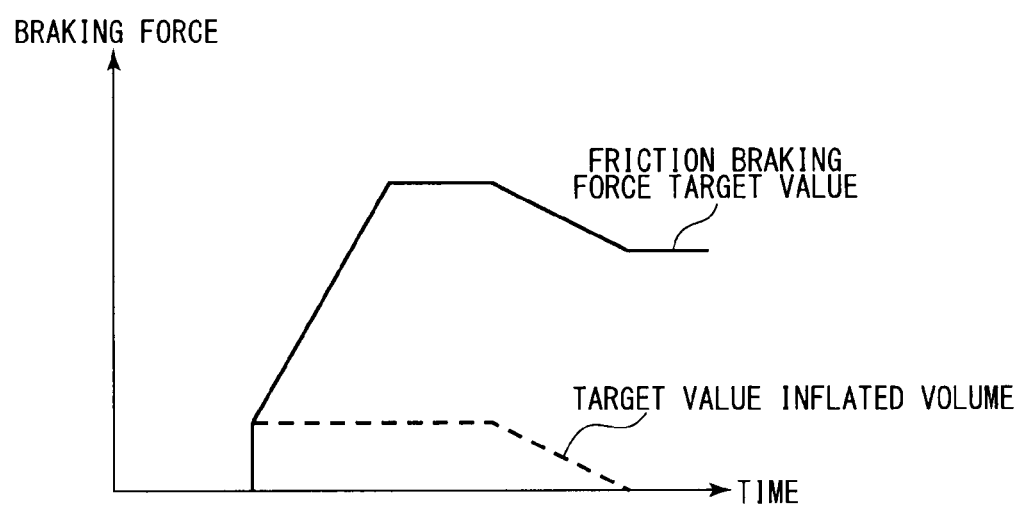
FIG. 16 is a graph illustrating an example of the time change in a friction braking force according to a fourth embodiment.

FIG. 16 is a graph illustrating an example of the time change in friction braking force according to the fourth embodiment. The vertical axis in FIG. 16 represents the braking force, while the horizontal axis represents an elapsed time. FIG. 16 illustrates the time change in the friction braking force target value. In FIG. 16, an inflated volume is provided when the target thereof rises. The brake ECU 70 makes the initial pressure-increasing gradient of the friction braking force in the regeneration prohibition mode larger than that in the regeneration permission mode. By inflating the friction braking force target value calculated based on the required braking force, the increase speed of the friction braking force is enhanced. The brake ECU 70 may reduce a target value inflated volume after a predetermined time has elapsed, to end the inflation, as illustrated.

By making, in this way, the friction braking force rise as a jump, a so-called "sticking feeling" can be provided. A sense of discomfort that the braking start is delayed in the regeneration prohibition mode in comparison with the regeneration permission mode can be reduced. The fourth embodiment may be applied to the aforementioned first to third embodiments or may be applied to a braking force control different from the first to third embodiments.

INDUSTRIAL APPLICABILITY

According to the present invention, an excellent fuel consumption performance and a good brake feeling can be both satisfied in a brake control system and a brake control method in which regenerative braking is used in combination.

The invention claimed is:

1. A brake control system comprising:
a friction brake unit configured to generate a friction braking force;
a regenerative brake unit configured to generate a regenerative braking force; and
a control unit configured to control a braking force by selecting one of a plurality of control modes including both a regeneration permission mode in which a total braking force is generated by the regenerative braking force and the friction braking force with the regenerative brake unit and the friction brake unit being controlled based on a regenerative target value and a friction target value that are defined based on a target deceleration, and a regeneration prohibition mode in which the target deceleration is generated by the friction braking force, wherein
the control unit generates the total braking force by providing a delay to at least the regenerative braking force in the regeneration permission mode, and provides a delay smaller than the delay to the friction braking force or does not provide a delay in the regeneration prohibition mode.

2. The brake control system according to claim 1, wherein the regeneration permission mode is a regeneration preference mode in which a regenerative braking force is preferentially generated and a shortage of the regenerative braking force with respect to a target deceleration is compensated by a friction braking force.

3. The brake control system according to claim 1, wherein the control unit calculates a temporary target deceleration in accordance with a brake operation by a driver, so that, in the regeneration prohibition mode, a friction braking force is generated based on a target deceleration obtained by processing the temporary target deceleration with a first low-pass filter, and in the regeneration permission mode, the total braking force is generated based on a target deceleration obtained by processing the temporary target deceleration with a second low-pass filter whose upper limit of the passing frequency band is smaller than that of the first low-pass filter.

4. The brake control system according to claim 1, wherein in the regeneration prohibition mode, the control unit permits, to the friction braking force, increase speed larger than that in the regeneration permission mode.

5. The brake control system according to claim 1, wherein when determining whether a brake operation by a driver is a sudden brake and determining that it is a sudden brake, the control unit reduces the delay.

6. The brake control system according to claim 1, wherein the control unit adjusts the response property of the regenerative braking force outputted by the regenerative brake unit based on a physical amount by which the sensitivity of a driver to a variation in a vehicle deceleration is affected.

7. The brake control system according to claim 6, wherein the control unit permits large increase speed of a regenerative braking force when the increase speed of a target deceleration is large, in comparison with when the increase speed of the target deceleration is small.

8. The brake control system according to claim 6, wherein the control unit permits large increase speed of a regenerative braking force when a vehicle is moving at high speed, in comparison with when the vehicle is moving at low speed.

9. The brake control system according to claim 1, wherein when the regeneration prohibition mode is switched to the regeneration permission mode during braking, the control unit limits the increase speed of a regenerative braking force, occurring immediately after the switching.

10. A brake control method for controlling a braking force by using a regenerative braking force and a friction braking force in combination, wherein
the braking force is controlled by selecting one of a plurality of control modes including both a regeneration permission mode in which the regenerative braking force and the friction braking force are generated based on a regenerative target value and a friction target value that are defined based on a target deceleration, and a regeneration prohibition mode in which the target deceleration is generated by the friction braking force, and wherein
in the regeneration permission mode, a delay is provided to at least the regenerative braking force, and in the regeneration prohibition mode, a delay smaller than the delay is provided to the friction braking force or a delay is not provided.

* * * * *